United States Patent
Inui et al.

(10) Patent No.: US 9,029,468 B2
(45) Date of Patent: May 12, 2015

(54) ADHESIVE LAYER FOR OPTICAL FILM, OPTICAL FILM HAVING ADHESIVE LAYER, IMAGE DISPLAY DEVICE, AND DETACHMENT METHOD FOR OPTICAL FILM

(75) Inventors: Kunihiro Inui, Ibaraki (JP); Toshitsugu Hosokawa, Ibaraki (JP); Takaaki Ishii, Ibaraki (JP); Masayuki Satake, Ibaraki (JP); Kenichi Okada, Ibaraki (JP); Toshitaka Takahashi, Ibaraki (JP); Taiki Shimokuri, Ibaraki (JP); Yousuke Makihata, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/988,631

(22) PCT Filed: Nov. 18, 2011

(86) PCT No.: PCT/JP2011/076677
§ 371 (c)(1),
(2), (4) Date: May 21, 2013

(87) PCT Pub. No.: WO2012/070494
PCT Pub. Date: May 31, 2012

(65) Prior Publication Data
US 2013/0248118 A1    Sep. 26, 2013

(30) Foreign Application Priority Data

Nov. 25, 2010 (JP) ................................ 2010-262703
Oct. 12, 2011 (JP) ................................ 2011-225032

(51) Int. Cl.
*B32B 38/10* (2006.01)
*C09J 133/08* (2006.01)
(Continued)

(52) U.S. Cl.
CPC .............. *C09J 133/08* (2013.01); *C09J 133/04* (2013.01); *G02F 1/1335* (2013.01); *B32B 38/10* (2013.01);
(Continued)

(58) Field of Classification Search
CPC ........ C09J 133/08; C09J 7/0217; C09J 33/04; B32B 38/10; C08L 33/02

USPC .................. 524/556, 561, 504; 156/701; 428/355 AC
See application file for complete search history.

(56) References Cited

U.S. PATENT DOCUMENTS

2006/0188712 A1*  8/2006  Okada et al. .................. 428/354
2010/0304135 A1   12/2010 Okada et al.
(Continued)

FOREIGN PATENT DOCUMENTS

JP   2002-241725 A      8/2002
JP   2002241725  A  *   8/2002
(Continued)

OTHER PUBLICATIONS

International Search Report for PCT/JP2011/076677, Mailing Date of Feb. 7, 2012.
(Continued)

*Primary Examiner* — Michael M Bernshteyn
(74) *Attorney, Agent, or Firm* — Westerman, Hattori, Daniels & Adrian, LLP

(57) ABSTRACT

A pressure-sensitive adhesive layer for an optical film made from an aqueous dispersion-type pressure-sensitive adhesive composition, wherein the aqueous dispersion-type pressure-sensitive adhesive composition is an aqueous dispersion comprising a water-dispersible (meth)acryl-based copolymer (A) having a glass transition temperature from −55° C. to less than 0° C.; and a water-soluble or water-dispersible component (B) having a glass transition temperature of 0° C. or more, a mixture ratio (A)/(B) is in the range of 50-97/3-50, the component (B) forms domains with maximum lengths between 1 nm and 200 nm in a resin component made of the (meth)acryl-based copolymer (A), and the pressure-sensitive adhesive layer has a haze value (H20) of 1% or less when having a thickness of 20 μm. The pressure-sensitive adhesive layer for an optical film, which is made from an aqueous dispersion-type pressure-sensitive adhesive composition has good reworkability or recyclability, and has a sufficient level of durability.

10 Claims, 4 Drawing Sheets

(51) Int. Cl.
- C09J 7/02 (2006.01)
- C08L 33/02 (2006.01)
- C09J 133/04 (2006.01)
- G02F 1/1335 (2006.01)
- C09D 133/08 (2006.01)
- C09J 7/00 (2006.01)
- C08K 3/36 (2006.01)

(52) U.S. Cl.
CPC .............. *C09J 7/0217* (2013.01); *C09D 133/08* (2013.01); *C09J 7/00* (2013.01); *G02F 1/133528* (2013.01); *G02F 2202/28* (2013.01); *C08K 3/36* (2013.01); *C09J 2205/102* (2013.01); *C08L 2201/54* (2013.01); *C09J 2201/606* (2013.01); *C09J 2201/622* (2013.01); *C09J 2203/318* (2013.01); *C09J 2433/00* (2013.01)

(56) References Cited

U.S. PATENT DOCUMENTS

| | | | |
|---|---|---|---|
| 2012/0252964 A1* | 10/2012 | Naito et al. | 524/560 |
| 2013/0052457 A1 | 2/2013 | Inui et al. | |

FOREIGN PATENT DOCUMENTS

| | | | |
|---|---|---|---|
| JP | 2002-256244 A | | 9/2002 |
| JP | 2003-292922 A | | 10/2003 |
| JP | 2003292922 A | * | 10/2003 |
| JP | 2006-016517 A | | 1/2006 |
| JP | 2006-036810 A | | 2/2006 |
| JP | 2006-124691 A | | 5/2006 |
| JP | 2006-316085 A | | 11/2006 |
| JP | 2006316085 A | * | 11/2006 |
| JP | 2007-186661 A | | 7/2007 |
| JP | 2009-155523 A | | 7/2009 |
| JP | 2010-007044 A | | 1/2010 |
| WO | 2011/145552 A1 | | 11/2011 |

OTHER PUBLICATIONS

Translation of the International Preliminary Report on Patentability (PCT/IB/338) (1 page), (PCT/IB/373) (1 page) of International Application No. PCT/JP2011/076677 mailed Jun. 20, 2013 (Form PCT/ISA/237) (14 pages).

Chinese Office Action dated Sep. 23, 2014, issued in corresponding Chinese Application No. 201180056807.1; w/English Translation. (20 pages).

Japanese Office Action dated Jan. 15, 2015, issued in corresponding Japanese Patent Application No. 2011-225032, w/English translation (11 pages).

* cited by examiner

ADHESIVE LAYER FOR OPTICAL FILM, OPTICAL FILM HAVING ADHESIVE LAYER, IMAGE DISPLAY DEVICE, AND DETACHMENT METHOD FOR OPTICAL FILM

TECHNICAL FIELD

The present invention relates to a pressure-sensitive adhesive layer for an optical film. The present invention also relates to a pressure-sensitive adhesive layer-attached optical film including an optical film and the pressure-sensitive adhesive layer provided thereon. The present invention also relates to an image display device such as a liquid crystal display device, an organic electroluminescence (EL) display device, a cathode-ray tube (CRT), or a plasma display panel (PDP) produced using the pressure-sensitive adhesive layer-attached optical film and to a part used together with an image display device, such as a front face plate, produced using the pressure-sensitive adhesive layer-attached optical film. Examples of the optical film that may be used include a polarizing plate, a retardation plate, an optical compensation film, a brightness enhancement film, a surface treatment film such as an anti-reflection film, and a laminate of any combination thereof. The present invention also relates to a method for peeling off the pressure-sensitive adhesive layer-attached optical film from a glass substrate immediately after or a long period after it is bonded to the glass substrate.

DESCRIPTION OF THE RELATED ART

Liquid crystal display devices, organic EL display devices, etc. have an image-forming mechanism including polarizing elements as essential components. For example, therefore, in a liquid crystal display device, polarizing elements are essentially placed on both sides of a liquid crystal cell, and generally, polarizing plates which include a polarizer and a transparent protective film bonded on one side or both sides of the polarizer are attached as the polarizing elements. Besides polarizing plates, various optical elements have been used in display panels such as liquid crystal panels and organic EL panels for improving display quality. Front face plates are also used to protect image display devices such as liquid crystal display devices, organic. EL display devices, CRTs, and PDPs or to provide a high-grade appearance or a differentiated design. Examples of parts used in image display devices such as liquid crystal display devices and organic EL display devices or parts used together with image display devices, such as front face plates, include retardation plates for preventing discoloration, viewing angle-widening films for improving the viewing angle of liquid crystal displays, brightness enhancement films for increasing the contrast of displays, and surface treatment films such as hard-coat films for one in imparting scratch resistance to surfaces, antiglare treatment films for preventing glare on image display devices, and anti-reflection films such as anti-reflective films and low-reflective films. These films are generically called optical films.

When such optical films are bonded to a display panel such as a liquid crystal cell or an organic EL panel or bonded to a front face plate, a pressure-sensitive adhesive is generally used. In the process of bonding an optical film to a display panel such as a liquid crystal cell or an organic EL panel or to a front face plate or bonding optical films together generally reduce optical loss. Therefore, a pressure-sensitive adhesive is used to bond the materials together. In such a case, a pressure-sensitive adhesive layer-attached optical film including an optical film and a pressure-sensitive adhesive layer previously formed on one side of the optical film is generally used, because it has some advantages such as no need for a drying process to fix the optical film.

The optical film used in the pressure-sensitive adhesive layer-attached optical film can easily shrink or expand under hot or moist conditions. Thus, after the pressure-sensitive adhesive layer-attached optical film is bonded to a display panel such as a liquid crystal cell or an organic EL panel or to a front face plate, lifting or peeling of the optical film can easily occur. Thus, the pressure-sensitive adhesive layer is required to be durable against heating, humidification, etc.

In the process of bonding a pressure-sensitive adhesive layer-attached optical film to a display panel such as a liquid crystal cell or an organic EL panel or to a front face plate, they can be misaligned, or a contaminant can be caught between the bonded surfaces. In such a case, the optical film may be peeled off from the display panel such as the liquid crystal cell or the organic EL panel or from the front face plate and be reused. When peeled off from the display panel such as the liquid crystal cell or the organic EL panel or from the front face plate, the pressure-sensitive adhesive layer-attached optical film is required not to have an adhesive state that can change the gap of the liquid crystal cell, reduce the function of the organic EL panel, or break the optical film. In other words, the pressure-sensitive adhesive layer-attached optical film is required to have re-peelability (reworkability) so that it can be easily peeled off. However, if the adhesiveness is simply improved with the emphasis on the durability of the pressure-sensitive adhesive layer of the pressure-sensitive adhesive layer-attached optical film, the reworkability will be reduced. The pressure-sensitive adhesive layer-attached optical film is also required to have recyclability so that it can be easily peeled off from the display panel such as the liquid crystal cell or the organic EL panel or from the front face plate for the purpose of recycling the display panel or the front face plate component after an image display device having the display panel with the pressure-sensitive adhesive layer-attached optical film bonded thereto or a product having the front face plate with the pressure-sensitive adhesive layer-attached optical film bonded thereto is used in home or office for a long period of time. In such a recycling process, however, a high adhesive strength of the pressure-sensitive adhesive layer can cause a problem such as breakage of the film or an adhesive residue on the display panel such as the liquid crystal cell or the organic EL panel or on the front face plate. In addition, the reworking or recycling process is required to be performed at a higher peeling rate. Unfortunately, the adhesive strength of conventional pressure-sensitive adhesive layers increases with increasing peeling rate, which causes a problem in that a sufficient level of reworkability or recyclability cannot be achieved.

Organic solvent-type pressure-sensitive adhesives have been dominantly used to form the pressure-sensitive adhesive layer of the pressure-sensitive adhesive layer-attached optical film. For example, it is proposed that an organic solvent-type pressure-sensitive adhesive composition capable of ensuring durability against peeling or the like and ensuring reworkability be used on optical members (Patent Document 1), in which the pressure-sensitive adhesive composition contains 100 parts by weight of a (meth)acryl-based polymer, 0.01 to 2 parts by weight of an isocyanate crosslinking agent, and 0.01 to 5 parts by weight of a silicone alkoxy oligomer.

In recent years, solvent-free pressure-sensitive adhesives, which are produced with no organic solvent, have been developed actively in view of a reduction in global environmental loading or an improvement in process stability. Known solvent-free pressure-sensitive adhesives typically include aqueous dispersion-type pressure-sensitive adhesive compositions containing a pressure-sensitive adhesive polymer component dispersed in water used as a dispersion medium. Unfortunately, since aqueous dispersion-type pressure-sensitive adhesive compositions generally contain a surfactant, such as an emulsifying agent or a dispersing agent, as a water-soluble, dispersion-stabilizing component, pressure-sensitive adhesive layers made from such aqueous dispersion-type pressure-sensitive adhesive compositions can be easily foamed under hot conditions due to the influence of the water-soluble component, and can often suffer from peeling or the like under moist conditions. Thus, they have a problem with durability. A pressure-sensitive adhesive layer made from an aqueous dispersion-type pressure-sensitive adhesive composition includes emulsion particles as a component and thus has interfaces between particles in its layer structure. Such a pressure-sensitive adhesive layer cannot have a sufficient level of moisture resistance and reworkability or recyclability even when produced using an aqueous dispersion-type pressure-sensitive adhesive composition in place of the composition disclosed in Patent Document 1.

To improve the durability, some proposals have been made in the field of optical films. For example, it is proposed that an acryl-based polymer emulsion produced with an alkyl (meth)acrylate and a phosphate group-containing monomer be used to form an aqueous dispersion-type pressure-sensitive adhesive composition for use on optical films, so that the composition can have improved adhesion to the glass substrate of a liquid crystal panel under hot or moist conditions (Patent Document 2). An aqueous dispersion-type pressure-sensitive adhesive composition capable of achieving durability and reworkability is also proposed (Patent Document 3), which contains 100 parts by weight of a (meth)acryl-based polymer (A) obtained by emulsion polymerization and containing 0.2 to 2% by weight of an unsaturated carboxylic acid as a monomer unit; 0.1 to 20 parts by weight of a (meth)acryl-based polymer (B) containing 1 to 7% by weight of an unsaturated carboxylic acid as a monomer unit, having a carboxylic acid equivalent higher than that of the (meth)acryl-based polymer (A), and having a weight average molecular weight of 2,000 to 50,000; and 0.01 to 1 part by weight of a silane coupling agent. Unfortunately, pressure-sensitive adhesive layers made from these aqueous dispersion-type pressure-sensitive adhesive compositions cannot have a sufficient level of reworkability or recyclability at a peeling rate (500 mm/minute or more) for a practical reworking or recycling process.

On the other hand, an aqueous dispersion-type pressure-sensitive adhesive composition for use on materials other than optical films is proposed (Patent Document 4), which can have an improved adhesive strength to a nonpolar substrate such as polyolefin and contains an aqueous dispersion (A) of a high-glass transition temperature (Tg) copolymer with a Tg of 90 to 105° C. and an aqueous dispersion of a low-Tg copolymer (B) with a Tg of −75 to −45° C. in a (A)/(B) ratio (solid weight ratio) of 1/99 to 15/85. An emulsion-type pressure-sensitive adhesive composition capable of exhibiting a high adhesive power to both of an adhesion-resistant material such as polyolefin and a rough-surface material such as corrugated cardboard is also proposed (Patent Document 5), which contains 65 to 80 parts by weight of an emulsion (A) of a low-Tg polymer with a Tg of less than −40° C., 20 to 35 parts by weight of an emulsion (B) of a high-Tg polymer with a Tg of −40 to 0° C., a water-soluble crosslinking agent (C-1) having two or more oxazoline groups per molecule and/or a crosslinking agent (C-2) having two or more aziridinyl groups per molecule, and a tackifying resin (D).

Unfortunately, the aqueous dispersion-type pressure-sensitive adhesive compositions disclosed in Patent Documents 4 and 5, which are designed to adhere to a nonpolar substrate such as polyolefin, cannot have a sufficient level of moisture resistance when put on non-alkali glass, which is a polar substrate. In addition, the aqueous dispersion-type pressure-sensitive adhesive composition containing a tackifier is not suitable for use on optical films because a pressure-sensitive adhesive layer made from such a composition has high haze.

PRIOR ART DOCUMENTS

Patent Documents

Patent Document 1: JP-A-2010-007044
Patent Document 2: JP-A-2007-186661
Patent Document 3: JP-A-2006-036810
Patent Document 4: JP-A-2006-016517
Patent Document 5: JP-A-2006-124691

SUMMARY OF THE INVENTION

Problems to be Solved by the Invention

An object of the present invention is to provide a pressure-sensitive adhesive layer for an optical film, which is made from an aqueous dispersion-type pressure-sensitive adhesive composition, has good reworkability or recyclability, and also has a sufficient level of durability.

Another object of the present invention is to provide a pressure-sensitive adhesive layer-attached optical film including an optical film and the pressure-sensitive adhesive layer for an optical film placed on at least one side of the optical film. A further object of the present invention is to provide an image display device including the pressure-sensitive adhesive layer-attached optical film.

A further object of the present invention is to provide a method for peeling off the pressure-sensitive adhesive layer-attached optical film from a glass substrate.

Means for Solving the Problems

As a result of earnest studies to solve the above problems, the inventors have accomplished the present invention based on the finding that the pressure-sensitive adhesive composition for an optical film etc., described below can solve the problems.

The present invention relates to a pressure-sensitive adhesive layer for an optical film made from an aqueous dispersion-type pressure-sensitive adhesive composition, wherein the aqueous dispersion-type pressure-sensitive adhesive composition is an aqueous dispersion including a water-dispersible (meth)acryl-based copolymer (A) containing an alkyl(meth)acrylate and a carboxyl group-containing monomer as monomer units and having a glass transition temperature from −55° C. to less than 0° C. (wherein the glass transition temperature is calculated based on monofunctional monomers for monomer units); and a water-soluble or water-dispersible component (B) having a glass transition temperature of 0° C. or more, a difference of the glass transition temperatures between the (meth)acryl-based copolymer (A) and the component (B) is 50° C. or more, a mixture ratio (A)/(B) (on a solid weight basis) of the (meth)acryl-based copolymer (A) and the component (B) is in the range of 50-97/3-50, the component (B) forms domains with maximum lengths between 1 nm and 200 nm in a resin component made of the (meth)acryl-based copolymer (A), and the pressure-sensitive adhesive layer has a haze value (H20) of 1% or less when having a thickness of 20 μm.

The pressure-sensitive adhesive layer preferably has an adhesive strength of 1 to 15 N/25 mm to glass at a peeling rate of 300 mm/minute during a storage period of 30 days or less at a temperature of 23° C. after the pressure-sensitive adhesive layer is bonded to glass, and an adhesive strength of the pressure-sensitive adhesive layer to glass at a peeling rate of more than 300 mm/minute is equal to or less than the adhesive strength of the pressure-sensitive adhesive layer to glass at a peeling rate of 300 nm/minute.

The pressure-sensitive adhesive layer preferably has an adhesive strength of 1 to 25 N/25 mm to glass at a peeling rate of 300 mm/minute after the pressure-sensitive adhesive layer is bonded to glass and stored at a temperature of 60° C. for a time period of 1,000 hours, and an adhesive strength of the pressure-sensitive adhesive layer to glass at a peeling rate of more than 300 mm/minute is equal to or less than the adhesive strength of the pressure-sensitive adhesive layer to glass at a peeling rate of 300 mm/minute.

In the pressure-sensitive adhesive layer, a water-soluble or water-dispersible organic material is illustrated as the component (B).

The water-soluble or water-dispersible organic material, for example, includes an aqueous dispersion of a (meth)acryl-based copolymer (B) including an alkyl(meth)acrylate as a monomer unit. The water-soluble or water-dispersible organic material, for example, also includes a water-soluble resin.

In the pressure-sensitive adhesive, a water-soluble or water-dispersible inorganic material is illustrated as the component (B). The water-soluble or water-dispersible inorganic material, for example, includes inorganic particles. The inorganic particles are preferably a colloidal inorganic material. The water-soluble or water-dispersible inorganic material, for example, also includes an alkali silicate.

The pressure-sensitive adhesive layer for an optical film preferably has a ratio (H200)/(H20) of a haze value (H200) to the haze value (H20) of 2 or less, wherein the haze value (H200) is a haze of the pressure-sensitive adhesive layer with a thickness of 200 μm.

The present invention also related to a pressure-sensitive adhesive layer-attached optical film, including an optical film and the pressure-sensitive adhesive layer for an optical film placed on at least one side of the optical film.

The present invention also related to an image display device including at least one piece of the pressure-sensitive adhesive layer-attached optical film.

The present invention also related to a method for peeling off an optical film, including peeling off the pressure-sensitive adhesive layer-attached optical film from a glass substrate after the pressure-sensitive adhesive layer-attached optical film is bonded to the glass substrate.

In the method for peeling off an optical film, the pressure-sensitive adhesive layer-attached optical film can be peeled off from the glass substrate at a peeling rate of 500 mm/minute or more.

Effect of the Invention

The moisture resistance of a pressure-sensitive adhesive layer-attached optical film can be determined from whether it peels when stored in a moist environment (for example, at 60° C. and 90% RH). Specifically, such peeling occurs at the interface between the pressure-sensitive adhesive layer and the adherend (such as glass) as a result of a reduction in the adhesive strength of the pressure-sensitive adhesive layer to the adherend during the storage of the pressure-sensitive adhesive layer-attached optical film in the moist environment.

In the present invention, the aqueous dispersion-type pressure-sensitive adhesive composition for use in forming the pressure-sensitive adhesive layer contains an aqueous dispersion of a common (meth)acryl-based copolymer (A) having a relatively low glass transition temperature and a component (B) having a specific high glass transition temperature. The component (B) imparts a cohesive strength to the pressure-sensitive adhesive layer made from the aqueous dispersion-type pressure-sensitive adhesive composition. Thus, the pressure-sensitive adhesive layer has high cohesive strength while maintaining the adhesive strength to the adherend, and is prevented from undergoing cohesive failure, so that peeling is successfully suppressed because of its moisture resistance.

In addition, the component (B) forms domains of specific sizes in a resin component made of the (meth)acryl-based copolymer (A). The pressure-sensitive adhesive layer containing such domains of the component (B) with a high glass transition temperature can have good reworkability or recyclability. Specifically, in contrast to conventional pressure-sensitive adhesive layers, the pressure-sensitive adhesive layer containing the component (B) in the form of domains does not increase in adhesive strength as the peeling rate is increased in a reworking or recycling process, and rather decreases in adhesive strength with increasing peeling rate, which makes it possible to achieve low adhesive strength at high peeling rate. Thus, the pressure-sensitive adhesive layer-attached optical film can be easily removed, for reworking or recycling, from an adherend, such as a liquid crystal cell, an organic EL panel or any other display panel, or a front face plate.

In addition, the presence of the domains does not cause depolarization because the size of the domains is adjusted to a specific value. The pressure-sensitive adhesive layer that has a haze value (H20) of 1% or less when having a thickness of 20 μm does not affect optical properties.

MODE FOR CARRYING OUT THE INVENTION

Figure 1:
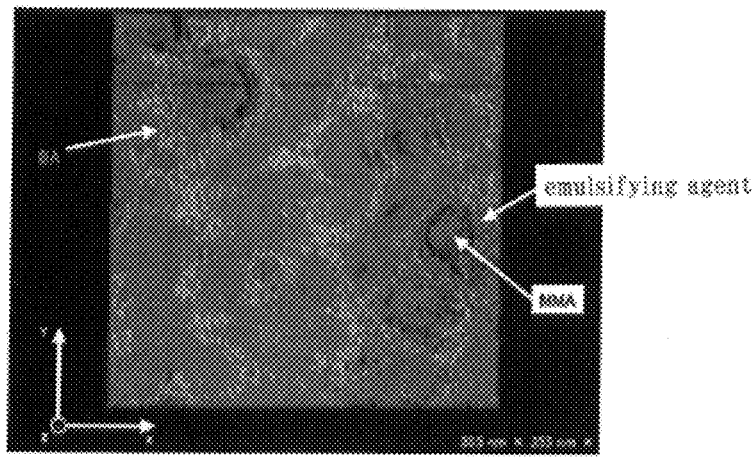
FIG. 1 is a 3D-TEM image of a pressure-sensitive adhesive layer of Example 1 according to the present invention.
Figure 2:
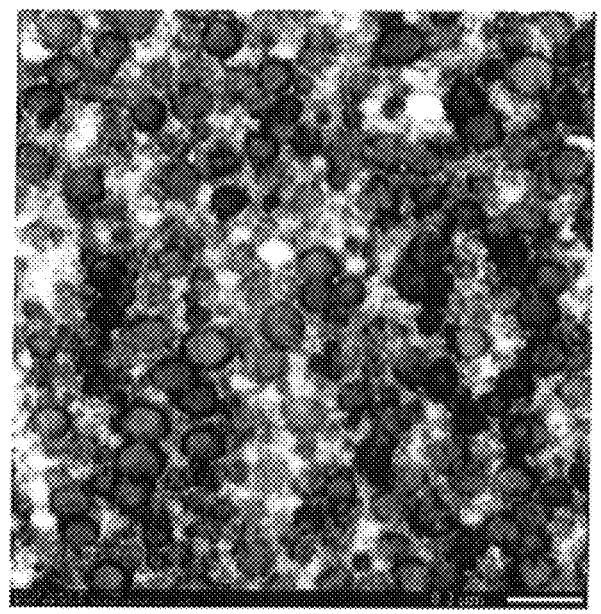
FIG. 2 is a TEM image of a pressure-sensitive adhesive layer of Example 2 according to the present invention.
Figure 3:
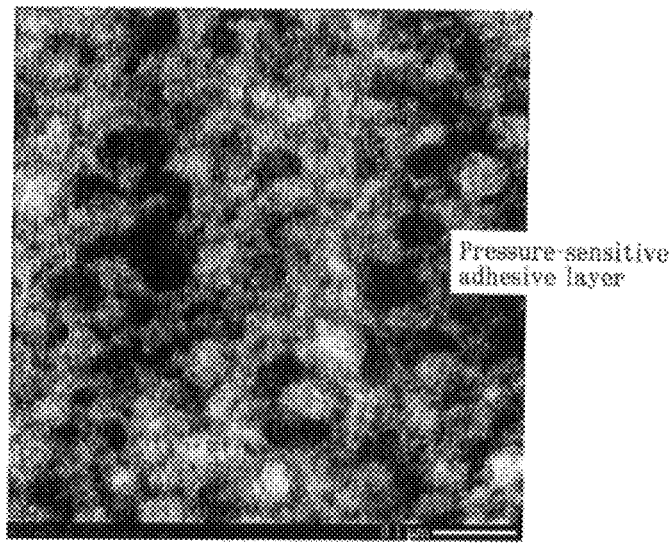
FIG. 3 is a TEM image of a pressure-sensitive adhesive layer of Example 14 according to the present invention.
Figure 4:
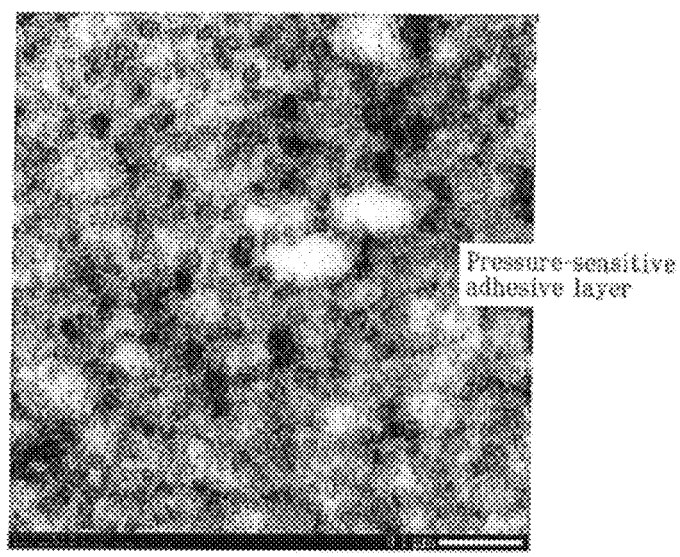
FIG. 4 is a TEM image of a pressure-sensitive adhesive layer of Example 16 according to the present invention.
Figure 5:
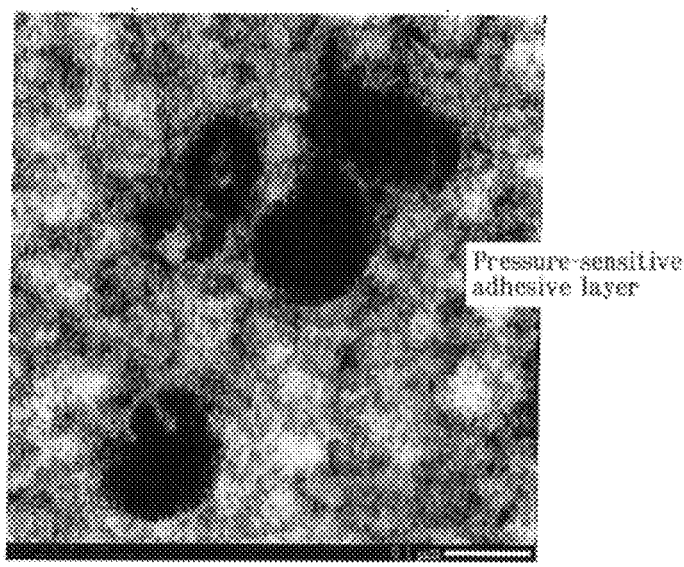
FIG. 5 is a TEM image of a pressure-sensitive adhesive layer of Example 24 according to the present invention.
Figure 6:
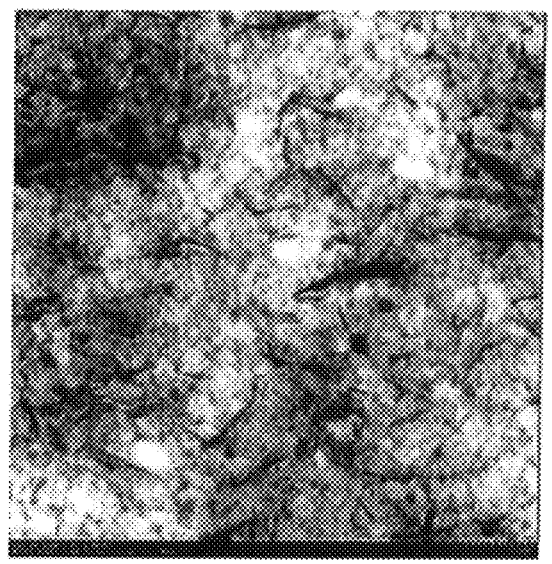
FIG. 6 is a TEM image of a pressure-sensitive adhesive layer of Comparative Example 1 according to the present invention.

The aqueous dispersion-type pressure-sensitive adhesive composition for use in forming the pressure-sensitive adhesive layer of the present invention for an optical film is an aqueous dispersion containing a (meth)acryl-based copolymer (A) with a glass transition temperature of from −55° C. to less than 0° C. and a component (B) with a glass transition temperature of 0° C. or more.

As stated above, the (meth)acryl-based copolymer (A) has a glass transition temperature of −55° C. to 0° C., and in this range, a reduction in cohesive strength can be prevented, while the tackiness of the pressure-sensitive adhesive is assured. The glass transition temperature is preferably −20° C. or less, more preferably −30° C. or less, even more preferably −35° C. or less, still more preferably −40° C. or less. If the (meth)acryl-based copolymer (A) has a glass transition temperature of more than 0° C., the pressure-sensitive adhesive can have reduced tackiness so that moisture-induced peeling can easily occur. On the other hand, the glass transition temperature is preferably −50° C. or more, and more preferably −45° C. or more (even more preferably more than −45° C.). If the (meth)acryl-based copolymer (A) has a glass transition temperature of less than −55° C., the pressure-sensitive adhesive can have reduced cohesive strength so that peeling over time can easily occur.

As stated above, the component (B) has a glass transition temperature of 0° C. or more, and within this range, the pressure-sensitive adhesive can provide improved reworkability or recyclability while having reliable moisture resistance. The glass transition temperature is preferably 50° C. or more, more preferably 60° C. or more, even more preferably 70° C. or more, still more preferably 80° C. or more, and yet more preferably 85° C. or more. If the component (B) has a glass transition temperature of less than 0° C., the pressure-sensitive adhesive would have lower cohesive strength and be more likely to peel, and its reworkability or recyclability would also be not good. There is no particular upper limit to the glass transition temperature. When the component (B) is an inorganic material, it can be determined to have a glass transition temperature of more than 300° C. When the component (B) is an organic material, peeling should be further suppressed in view of moisture resistance, and thus, the glass transition temperature of the component (B) is preferably 180° C. or less, more preferably 110° C. or less, even more preferably 100° C. or less, still more preferably 90° C. or less (preferably less than 90° C.).

A difference of the glass transition temperatures between the (meth)acryl-based copolymer (A) and the component (B) is 50° C. or more. The difference of the glass transition temperatures is preferably 70° C. or more, more preferably 80° C. or more, even more preferably 90° C. or more, still more preferably 100° C. or more, yet more preferably 110° C. or more, even yet more preferably 120° C. or more so that a reduction in cohesive strength can be prevented while the tackiness of the pressure-sensitive adhesive is assured. Such a glass transition temperature difference is also preferred in view of reworkability or recyclability.

The glass transition temperatures of the (meth)acryl-based copolymer (A) is theoretical values each calculated from the FOX equation taking into account the types and contents of the monomer units of each polymer.

FOX equation: $1/Tg = w_1/Tg_1 + w_2/Tg_2 + \ldots + w_n/Tg_n$ (Tg: the glass transition temperature (K) of the polymer; $Tg_1$, $Tg_2$, ... $Tg_n$: the glass transition temperatures (K) of the homopolymers of the respective monomers; $w_1$, $w_2$, ... $w_n$: the weight fractions of the respective monomers)

It should be noted that the glass transition temperatures of the (meth)acryl-based copolymers (A) is calculated based on the monofunctional monomers. Namely, even when the polymers each contain a polyfunctional monomer as a monomer unit, the polyfunctional monomer is neglected in the calculation of the glass transition temperature, because the polyfunctional monomer is used in a small amount so that its influence on the glass transition temperature of the copolymer is low. It should also be noted that an alkoxysilyl group-containing monomer is recognized as a polyfunctional monomer and therefore neglected in the calculation of the glass transition temperatures. The theoretical glass transition temperatures calculated from the FOX equation well agree with actual glass transition temperatures determined from differential scanning calorimetry (DSC), dynamic viscoelasticity, etc.

In the (meth)acryl-based copolymer (A), the monomer unit type and the component composition are not restricted as long as they contain an alkyl(meth)acrylate and a carboxyl group-containing monomer as monomer units and satisfy the requirements for the glass transition temperatures. The term "alkyl(meth)acrylate" refers to alkyl acrylate and/or alkyl methacrylate, and "(meth)" is used in the same meaning in the description.

In view of emulsion polymerization reactivity, the alkyl (meth)acrylate used to form the (meth)acryl-based copolymer (A) preferably has a water solubility in a specific range, and an alkyl acrylate having an alkyl group of 1 to 18 carbon atoms is preferably used to form a major component, so that the glass transition temperature can be easily controlled. Examples of the alkyl(meth)acrylate include methyl(meth)acrylate, ethyl(meth)acrylate, propyl(meth)acrylate, n-butyl(meth)acrylate, tert-butyl(meth)acrylate, n-hexyl(meth)acrylate, cyclohexyl(meth)acrylate, 2-ethylhexyl(meth)acrylate, n-octyl(meth)acrylate, lauryl(meth)acrylate, tridecyl(meth)acrylate, stearyl(meth)acrylate, and other alkyl esters of (meth)acrylic acid. These may be used alone or in combination of two or more. Among these, an alkyl(meth)acrylate having an alkyl group of 3 to 9 carbon atoms is preferable, such as propyl(meth)acrylate, n-butyl(meth)acrylate, 2-ethylhexyl(meth)acrylate, or n-octyl(meth)acrylate. The content of the alkyl(meth)acrylate(s) in all monomer units is preferably from 60 to 99.9% by weight, more preferably from 70 to 99.9% by weight, even more preferably from 80 to 99.9% by weight, still more preferably from 80 to 99% by weight, and yet more preferably from 80 to 95% by weight.

In view of emulsion polymerization reactivity, the (meth)acryl-based copolymer (A) preferably has a water solubility in a specific range, and an alkyl methacrylate having an alkyl group of 1 to 18 carbon atoms may be used, so that the glass transition temperature can be easily controlled. Examples of the alkyl methacrylate include methyl methacrylate, ethyl methacrylate, propyl methacrylate, n-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, and other alkyl esters of methacrylic acid. These may be used alone or in combination of two or more. Among these, methyl methacrylate, ethyl methacrylate, and cyclohexyl methacrylate are preferred. The content of the alkyl methacrylate(s) in all monomer units is preferably from 39.9% by weight or less, more preferably 30% by weight or less, even more preferably 20% by weight or less, still more preferably 15% by weight or less, and yet more preferably 10% by weight or less.

To improve the tackiness of the pressure-sensitive adhesive and provide stability for the emulsion, a carboxyl group-containing monomer is used to form the (meth)acryl-based copolymer (A). The carboxyl group-containing monomer may be monomer having a carboxyl group and a radically-polymerizable unsaturated double bond-containing group such as a (meth)acryloyl group or a vinyl group, examples of which include (meth)acrylic acid, itaconic acid, maleic acid, fumaric acid, crotonic acid, carboxyethyl acrylate, and carboxypentyl acrylate. The content of the carboxyl group-containing monomer in all monomer units of the (meth)acryl-based polymer (A) is preferably from 0.1 to 10% by weight, more preferably from 0.5 to 7% by weight, and even more preferably from 1 to 5% by weight.

In addition to the alkyl(meth)acrylate and the carboxyl group-containing monomer, at least one copolymerizable monomer having an unsaturated double bond-containing polymerizable group such as a (meth)acryloyl group or a vinyl group may be introduced into the (meth)acryl-based polymer (A) by copolymerization in order to stabilize water dispersibility, to improve adhesion to a base material such as an optical film for the pressure-sensitive adhesive layer, and to improve initial tackiness to the adherend.

An alkoxysilyl group-containing monomer is mentioned as the copolymerizable monomer. The alkoxysilyl group-containing monomer may be a silane coupling agent-type unsaturated monomer having an alkoxysilyl group and a group having at least one unsaturated double bond, such as a (meth) acryloyl group or a vinyl group. The alkoxysilyl group-containing monomer is preferred in order to allow the (meth) acryl-based copolymer (A) to have a crosslinked structure and improved adhesion to glass.

Examples of the alkoxysilyl group-containing monomer include an alkoxysilyl group-containing (meth)acrylate monomer and an alkoxysilyl group-containing vinyl monomer. Examples of the alkoxysilyl group-containing (meth) acrylate monomer include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, and 3-(meth)acryloyloxypropyl-tributoxysilane; (meth)acryloyloxyalkyl-alkyldialkoxysilanes such as (meth)acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane, and 3-(meth)acryloyloxypropyl-propyldiethoxysilane; and (meth)acryloyloxyalkyl-dialkyl(mono)alkoxysilanes corresponding to these monomers. For example, alkoxysilyl group-containing vinyl monomers include vinyltrialkoxysilanes such as vinyltrimethoxysilane, vinyltriethoxysilane, vinyltripropoxysilane, vinyltriisopropoxysilane, and vinyltributoxysilane, and vinylalkyldialkoxysilanes and vinyldialkylalkoxysilanes corresponding thereto; vinylalkyltrialkoxysilanes such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane, and γ-vinylpropyltributoxysilane, and (vinylalkyl)alkyldialkoxysilanes and (vinylalkyl)dialkyl(mono)alkoxysilanes corresponding thereto.

The content of the alkoxysilyl group-containing monomer in all monomer units of the (meth)acryl-based polymer (A) is preferably from 0.001 to 1% by weight, more preferably from 0.01 to 0.5% by weight, and even more preferably from 0.03 to 0.1% by weight. If it is less than 0.001% by weight, the effect of using the alkoxysilyl group-containing monomer (providing a crosslinked structure and adhesion to glass) may be insufficiently obtained. If it is more than 1% by weight, the pressure-sensitive adhesive layer may have a too high degree of crosslinkage, so that the pressure-sensitive adhesive layer may crack over time.

The copolymerizable monomer may be a phosphate group-containing monomer. The phosphate group-containing monomer is effective in improving adhesion to glass.

For example, the phosphate group-containing monomer may be a phosphate group-containing monomer represented by formula (1) below or a salt thereof.

[Formula (1)]

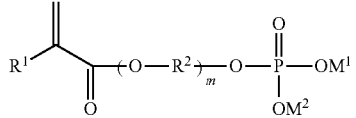

(1)

In formula (1), $R^1$ represents a hydrogen atom or a methyl group, $R^2$ represents an alkylene group of 1 to 4 carbon atoms, m represents an integer of 2 or more, and $M^1$ and $M^2$ each independently represent a hydrogen atom or a cation.

In formula (1), m is 2 or more, preferably 4 or more, generally 40 or less, and m represents the degree of polymerization of the oxyalkylene groups. The polyoxyalkylene group may be a polyoxyethylene group or a polyoxypropylene group, and these polyoxyalkylene groups may include random, block, or graft units. The cation of the salt of the phosphate group is typically, but not limited to, an inorganic cation such as an alkali metal such as sodium or potassium or an alkaline-earth metal such as calcium or magnesium, or an organic cation such as a quaternary amine.

The content of the phosphate group-containing monomer in all monomer units of the (meth)acryl-based polymer (A) is preferably from 0.1 to 20% by weight. If it is less than 0.1% by weight, the effect of using the phosphate group-containing monomer (suppression of the formation of linear bubbles) may be insufficiently obtained, while a content of more than 20% by weight is not preferable in view of polymerization stability or pressure-sensitive adhesive properties.

Examples of copolymerizable monomers other than the alkoxysilyl group-containing monomer and the phosphate group-containing monomer include acid anhydride group-containing monomers such as maleic anhydride and itaconic anhydride; aryl(meth)acrylate such as phenyl(meth)acrylate; vinyl esters such as vinyl acetate and vinyl propionate; styrene monomers such as styrene; epoxy group-containing monomers such as glycidyl(meth)acrylate and methylglycidyl(meth)acrylate; hydroxyl group-containing monomers such as 2-hydroxyethyl(meth)acrylate and 2-hydroxypropyl (meth)acrylate; nitrogen atom-containing monomers such as (meth)acrylamide, N,N-dimethyl(meth)acrylamide, N,N-diethyl(meth)acrylamide, N-isopropyl(meth)acrylamide, N-butyl(meth)acrylamide, N-methylol(meth)acrylamide, N-methylolpropane(meth)acrylamide, (meth)acryloylmorpholine, aminoethyl(meth)acrylate, N,N-dimethylaminoethyl(meth)acrylate, and tert-butylaminoethyl(meth)acrylate; alkoxy group-containing monomers such as methoxyethyl (meth)acrylate and ethoxyethyl(meth)acrylate; cyano group-containing monomers such as acrylonitrile and methacrylonitrile; functional monomers such as 2-methacryloyloxyethyl isocyanate; olefin monomers such as ethylene, propylene, isoprene, butadiene, and isobutylene; vinyl ether monomers such as vinyl ether; halogen atom-containing monomers such as vinyl chloride; and other monomers including vinyl group-containing heterocyclic compounds such as N-vinylpyrrolidone, N-(1-methylvinyl)pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, and N-vinylmorpholine, and N-vinylcarboxylic acid amides.

Examples of the copolymerizable monomer also include maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide; and sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid.

Examples of the copolymerizable monomer also include glycol acrylate monomers such as polyethylene glycol(meth)acrylate, polypropylene glycol(meth)acrylate, methoxyethylene glycol(meth)acrylate, and methoxypolypropylene glycol(meth)acrylate; and other monomers such as acrylic ester monomers containing a heterocyclic ring or a halogen atom, such as tetrahydrofurfuryl(meth)acrylate and fluoro(meth)acrylate.

A polyfunctional monomer, other than the above alkoxysilyl group-containing monomer, may also be used as the copolymerizable monomer for a purpose such as control of the gel fraction of the aqueous dispersion pressure-sensitive adhesive composition. The polyfunctional monomer may be a compound having two or more unsaturated double bonds such as those in (meth)acryloyl groups or vinyl groups. Examples that may also be used include (meth)acrylate esters of polyhydric alcohols, such as (mono or poly)alkylene glycol di(meth)acrylates including (mono or poly)ethylene glycol di(meth)acrylates such as ethylene glycol di(meth)acrylate, diethylene glycol di(meth)acrylate, triethylene glycol di(meth)acrylate, trimethylolpropane tri(meth)acrylate, and tetraethylene glycol di(meth)acrylate, (mono or poly)propylene glycol di(meth)acrylate such as propylene glycol di(meth)acrylate, neopentyl glycol di(meth)acrylate, 1,6-hexanediol di(meth)acrylate, pentaerythritol di(meth)acrylate, trimethylolpropane tri(meth)acrylate, pentaerythritol tri(meth)acrylate, and dipentaerythritol hexa(meth)acrylate; polyfunctional vinyl compounds such as divinylbenzene; diacetone acrylamide; and compounds having two or more reactive unsaturated double bonds which have different reactivity respectively, such as allyl(meth)acrylate and vinyl (meth)acrylate. The polyfunctional monomer may also be a compound having a polyester, epoxy or urethane skeleton to which two or more unsaturated double bonds are added in the form of functional groups such as (meth)acryloyl groups or vinyl groups in the same manner as the monomer component, such as polyester (meth)acrylate, epoxy (meth)acrylate, or urethane (meth)acrylate.

When a monofunctional monomer is used as the copolymerizable monomer other than the alkoxysilyl group-containing monomer and the phosphate group-containing monomer, the content of the copolymerizable monomer in all monomer units of the (meth)acryl-based polymer (A) is preferably 20% by weight or less, more preferably 10% by weight or less, and even more preferably 5% by weight or less in view of the stability of the aqueous dispersion and prevention of an excessive increase in the viscosity of the aqueous dispersion. When a polyfunctional monomer is used as the copolymerizable monomer, the content of the copolymerizable monomer in all monomer units of the (meth)acryl-based polymer (A) is preferably 5% by weight or less, more preferably 3% by weight or less, and even more preferably 1% by weight or less in view of the stability of the aqueous dispersion.

An aqueous dispersion of the (meth)acryl-based copolymer (A) can be obtained by polymerization in water of a monomer component containing an alkyl(meth)acrylate and a carboxyl group-containing monomer in the presence of a surfactant and a radical polymerization initiator. The polymerization form may be emulsion polymerization, suspension polymerization, or dispersion polymerization. The emulsion polymerization, the suspension polymerization, and the dispersion polymerization produce a polymer emulsion, a polymer suspension, and a polymer dispersion, respectively. The type of the pressure-sensitive adhesive polymer and the means for polymerization are selected depending on the type of the pressure-sensitive adhesive. The surfactant, which may be an emulsifying agent in the case of emulsion polymerization or a dispersing gent in the case of suspension polymerization, is appropriately selected depending on each polymerization mode.

In the present invention, the aqueous dispersion for the aqueous dispersion-type pressure-sensitive adhesive composition is preferably an emulsion-type pressure-sensitive adhesive produced using a polymer emulsion obtained by emulsion polymerization.

According to a conventional technique, the monomer component may be emulsified in water and then subjected to emulsion polymerization. This process can produce an aqueous dispersion (polymer emulsion) containing the (meth) acryl-based copolymer (A) as a base polymer. In the emulsion polymerization, for example, the monomer components, a surfactant (an emulsifying agent), and a radical polymerization initiator, and optionally a chain transfer agent or the like are mixed as appropriate. More specifically, for example, a known emulsion polymerization method may be employed, such as a batch mixing method (batch polymerization method), a monomer dropping method, or a monomer emulsion dropping method. In the monomer dropping method, or the monomer emulsion dropping method continuous dropping or divided dropping is appropriately selected. These methods may be appropriately combined. While reaction conditions and so on may be appropriately selected, for example, the polymerization temperature is preferably from about 40 to about 95° C., and the polymerization time is preferably from about 30 minutes to about 24 hours.

The surfactant (emulsifying agent) for use in the emulsion polymerization may be, but not limited to, any of various surfactants commonly used in emulsion polymerization. As the surfactant, an anionic or a nonionic surfactant is generally used. Examples of the anionic surfactant include higher fatty acid salts such as sodium oleate; alkylarylsulfonate salts such as sodium dodecylbenzenesulfonate; alkylsulfate ester salts such as sodium laurylsulfate and ammonium laurylsulfate; polyoxyethylene alkyl ether sulfate ester salts such as sodium polyoxyethylene lauryl ether sulfate; polyoxyethylene alkyl aryl ether sulfate ester salts such as sodium polyoxyethylene nonyl phenyl ether sulfate; alkyl sulfosuccinic acid ester salts such as sodium monooctyl sulfosuccinate, sodium dioctyl sulfosuccinate, and sodium polyoxyethylene lauryl sulfosuccinate, and derivatives thereof; polyoxyethylene distyrenated phenyl ether sulfate ester salts; and sodium naphthalenesulfonate-formalin condensate. Examples of the nonionic surfactant include polyoxyethylene alkyl ethers such as polyoxyethylene lauryl ether and polyoxyethylene stearyl ether; polyoxyethylene alkyl phenyl ethers such as polyoxyethylene octyl phenyl ether and polyoxyethylene nonyl phenyl ether; sorbitan higher fatty acid esters such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monostearate; glycerin higher fatty acid esters such as oleic acid monoglyceride and stearic acid monoglyceride; and polyoxyethylene-polyoxypropylene block copolymers, and polyoxyethylene distyrenated phenyl ether.

Besides the above non-reactive surfactants, a reactive surfactant having a radical-polymerizable functional group containing an ethylenic unsaturated double bond may be used as the surfactant. The reactive surfactant may be a radical-polymerizable surfactant prepared by introducing a radical-polymerizable functional group (radically reactive group) such as a propenyl group or an allyl ether group into the anionic surfactant or the nonionic surfactant. These surfactants may be appropriately used alone or in any combination. Among these surfactants, the radical-polymerizable surfactant having a radical-polymerizable functional group is preferably used in view of the stability of the aqueous dispersion or the durability of the pressure-sensitive adhesive layer.

Examples of anionic reactive surfactants include alkyl ether surfactants (examples of commercially available products include AQUALON KH-05, KH-10, and KH-20 manufactured by Dai-ichi Kogyo Seiyaku Co., Ltd., ADEKA REASOAP SR-10N and SR-20N manufactured by ADEKA CORPORATION, LATEMUL PD-104 manufactured by Kao Corporation, and others); sulfosuccinic acid ester surfactants (examples of commercially available products include LATEMUL S-120, S-120A, S-180P, and S-180A manufactured by Kao Corporation and ELEMINOL JS-2 manufactured by Sanyo Chemical Industries, Ltd., and others); alkyl phenyl ether surfactants or alkyl phenyl ester surfactants (examples of commercially available products include AQUALON H-2855A, H-3855B, H-3855C, H-3856, HS-05, HS-10, HS-20, HS-30, BC-05, BC-10, and BC-20 manufactured by Dai-ichi Kogyo Seiyaku Co., Ltd., and ADEKA REASOAP SDX-222, SDX-223, SDX-232, SDX-233, SDX-259, SE-10N, and SE-20N manufactured by ADEKA CORPORATION); (meth)acrylate sulfate ester surfactants (examples of commercially available products include ANTOX MS-60 and MS-2N manufactured by Nippon Nyukazai Co., Ltd., ELEMINOL RS-30 manufactured by Sanyo Chemical Industries Co., Ltd., and others); and phosphoric acid ester surfactants (examples of commercially available products include H-3330PL manufactured by Dai-ichi Kogyo Seiyaku Co., Ltd. ADEKA REASOAP PP-70 manufactured by ADEKA CORPORATION, and others). Examples of nonionic reactive surfactants include alkyl ether surfactants (examples of commercially available products include ADEKA REASOAP ER-10, ER-20, ER-30, and ER-40 manufactured by ADEKA CORPORATION, LATEMUL PD-420, PD-430, and PD-450 manufactured by Kao Corporation, and others); alkyl phenyl ether surfactants or alkyl phenyl ester surfactants (examples of commercially available products include AQUALON RN-10, RN-20, RN-30, and RN-50 manufactured by Dai-ichi Kogyo Seiyaku Co., Ltd., ADEKA REASOAP NE-10, NE-20, NE-30, and NE-40 manufactured by ADEKA CORPORATION, and others); and (meth)acrylate sulfate ester surfactants (examples of commercially available products include RMA-564, RMA-568, and RMA-1114 manufactured by Nippon Nyukazai Co., Ltd, and others).

The content of the surfactant is preferably from 0.3 to 5 parts by weight based on 100 parts by weight of the monomer components including the alkyl(meth)acrylate. Pressure-sensitive adhesive properties, polymerization stability, mechanical stability, etc. can be improved by controlling the content of the surfactant. The surfactant content is more preferably from 0.3 to 3 parts by weight.

The radical polymerization initiator may be, but not limited to, any known radical polymerization initiator commonly used in emulsion polymerization. Examples include azo initiators such as 2,2'-azobisisobutylonitrile, 2,2'-azobis(2-methylpropionamidine)disulfate, 2,2'-azobis(2-methylpropionamidine)dihydrochloride, 2,2'-azobis(2-amidinopropane) dihydrochloride, and 2,2'-azobis[2-(2-(2-imidazoline-2-yl) propane]dihydrochloride; persulfate initiators such as potassium persulfate and ammonium persulfate; peroxide initiators such as benzoyl peroxide, tert-butyl hydroperoxide, and hydrogen peroxide; substituted ethane initiators such as phenyl-substituted ethane; and carbonyl initiators such as aromatic carbonyl compounds. These polymerization initiators may be appropriately used alone or in any combination. If desired, the emulsion polymerization may be performed using a redox system initiator, in which a reducing agent is used in combination with the polymerization initiator. This makes it easy to accelerate the emulsion polymerization rate or to perform the emulsion polymerization at low temperature. Examples of such a reducing agent include reducing organic compounds such as ascorbic acid, erythorbic acid, tartaric acid, citric acid, glucose, and metal salts of formaldehyde sulfoxylate or the like; reducing inorganic compounds such as sodium thiosulfate, sodium sulfite, sodium bisulfite, and sodium metabisulfite; and ferrous chloride, Rongalite, and thiourea dioxide.

The content of the radical polymerization initiator is typically from about 0.02 to about 1 part by weight, preferably from 0.02 to 0.5 parts by weight, more preferably from 0.08 to 0.3 parts by weight, based on 100 parts by weight of the monomer components, while it is appropriately selected. If it is less than 0.02 parts by weight, the radical polymerization initiator may be less effective. If it is more than 1 part by weight, the (meth)acryl-based polymer (A) in the aqueous dispersion (polymer emulsion) may have a reduced molecular weight, so that the aqueous dispersion pressure-sensitive adhesive composition may have reduced durability. In the case of a redox system initiator, the reducing agent is preferably used in an amount of 0.01 to 1 part by weight based on 100 parts by weight of the total amount of the monomer components.

A chain transfer agent is optionally used to control the molecular weight of the (meth)acryl-based polymer. In general, chain transfer agents commonly used in emulsion polymerization are used. Examples include 1-dodecanthiol, mercaptoacetic acid, 2-mercaptoethanol, 2-ethylhexyl thioglycolate, 2,3-dimercapto-1-propanol, mercaptopropionic acid esters, and other mercaptans. These chain transfer agents may be appropriately used alone or in any combination. For example, the content of the chain transfer agent is from 0.001 to 0.3 parts by weight based on 100 parts by weight of the monomer components.

Such emulsion polymerization makes it possible to prepare the (meth)acryl-based copolymer (A) in the form of an aqueous dispersion (emulsion). The average particle size of such an aqueous dispersion-type (meth)acryl-based copolymer (A) is typically adjusted to 0.05 μm to 3 μm, and preferably to 0.05 μm to 1 μm. If the average particle size is less than 0.05 μm, the viscosity of the aqueous dispersion-type pressure-sensitive adhesive can increase in some cases, and if it is more than 1 μm, adhesiveness between particles can decrease so that cohesive strength can decrease in some cases.

For maintaining the stability of the aqueous dispersion, the carboxyl group-containing monomer or the like, which is included in at least one of the (meth)acryl-based polymer (A) that is contained in the aqueous dispersion as a monomer unit, should preferably be neutralized. For example, the neutralization can be performed using ammonia, an alkali metal hydroxide, or the like.

In general, the aqueous dispersion (meth)acryl-based polymer (A) according to the present invention preferably has a weight average molecular weight of 1,000,000 or more. In particular, the weight average molecular weight is preferably from 1,000,000 to 4,000,000 in view of heat resistance or moisture resistance. A weight average molecular weight of less than 1,000,000 is not preferred, because with such a molecular weight, heat resistance or moisture resistance may decrease. The pressure-sensitive adhesive obtained by the emulsion polymerization is preferred because the polymerization mechanism can produce very high molecular weight. It should be noted, however, that the pressure-sensitive adhesive obtained by the emulsion polymerization generally has a high gel content and cannot be subjected to GPC (gel permeation chromatography) measurement, which means that it is often difficult to identify the molecular weight by actual measurement.

The component (B) may be any of a variety of water-soluble or water-dispersible compounds having a glass transition temperature of 0° C. or more. The glass transition temperature of the component (B) can be determined using the method described below depending on the type of the component (B). Specifically, when the component (B) is a (meth)acryl-based copolymer (B), the theoretical glass transition temperature should be used, which can be calculated from the FOX equation for the (meth)acryl-based copolymer (A). When the component (B) is a water-soluble or water-dispersible organic material (polymer) other than the (meth)acryl-based copolymer (B), its glass transition temperature can be determined by differential scanning calorimetry (DSC). When the component (B) is a water-soluble or water-dispersible inorganic material, the glass transition temperature of the component (B) can be determined by differential scanning calorimetry (DSC).

The water-soluble or water-dispersible organic material (polymer) for use as the component (B) may be an aqueous dispersion of the (meth)acryl-based copolymer (B) including an alkyl(meth)acrylate as a monomer unit.

In view of emulsion polymerization reactivity, the alkyl (meth)acrylate used to form the (meth)acryl-based copolymer (B) preferably has a water solubility in a specific range, and an alkyl methacrylate having an alkyl group of 1 to 18 carbon atoms mentioned in the (meth)acryl-based copolymer (A) is preferably used to form a major component, so that the glass transition temperature can be easily controlled. The alkyl methacrylates may be used alone or in combination of two or more. Examples of the alkyl methacrylate may include those listed above. Among those listed above, methyl methacrylate, ethyl methacrylate, tert-butyl methacrylate, isobornyl methacrylate and cyclohexyl methacrylate are preferred. The content of the alkyl methacrylate(s) in all monomer units is preferably from 60 to 100% by weight, more preferably from 70 to 99.9% by weight, even more preferably from 80 to 99.9% by weight, still more preferably from 80 to 99% by weight, and yet more preferably from 80 to 95% by weight.

In view of emulsion polymerization reactivity, the (meth)acryl-based copolymer (B) preferably has a water solubility in a specific range, and an alkyl acrylate having an alkyl group of 1 to 18 carbon atoms mentioned in the (meth)acryl-based copolymer (A) may be used, so that the glass transition temperature can be easily controlled. The alkyl acrylates may be used alone or in combination of two or more. Examples of the alkyl acrylate may include those listed above. Among those listed above, alkyl acrylates having an alkyl group of 3 to 9 carbon atoms are preferred, such as propyl acrylate, n-butyl acrylate, 2-ethylhexyl acrylate, and n-octyl acrylate. The content of the alkyl acrylate(s) in all monomer units is preferably 39.9% by weight or less, more preferably from 5 to 30% by weight, even more preferably from 5 to 20% by weight.

The (meth)acryl-based copolymer (B) may also include a monomer unit or units derived from any of the copolymerizable monomers listed for the (meth)acryl-based copolymer (A). The copolymerizable monomer may be a carboxyl group-containing monomer, an alkoxysilyl group-containing monomer, a phosphate group-containing monomer, a polyfunctional monomer, or any other monomer. The content of any of these copolymerizable monomers may be the same as that in the (meth)acryl-based copolymer (A). An aqueous dispersion of the (meth)acryl-based copolymer (B) may be prepared by the same process as that for preparing the (meth)acryl-based copolymer (A).

The water-soluble or water-dispersible organic material (polymer) for use as the component (B) may also be a water-soluble resin. Examples of such a water-soluble resin include poly(meth)acrylic acid or a copolymer of (meth)acrylic acid and an alkyl(meth)acrylate (with an alkyl group of 1 to 18 carbon atoms) or the like, and an alkali metal salt thereof, such as a sodium salt thereof, or an ammonium salt thereof; an acrylamide-alkyl (meth)acrylate-(meth)acrylic acid copolymer, a styrene-maleic anhydride copolymer, an isobutylene-maleic anhydride copolymer, and an alkali metal salt thereof, such as a sodium salt thereof, or an ammonium salt thereof; an acrylamide-alkyl(meth)acrylate copolymer; polyvinylpyrrolidone; polyacrylamide; cellulose, derivatives such as methoxycellulose, hydroxyethyl cellulose, carboxymethyl cellulose, methyl cellulose, and ethyl cellulose; polyvinyl alcohol, sodium alginate, gelatin, casein, starch, and derivatives thereof.

Besides the above, examples of the water-soluble or water-dispersible organic material (polymer) for use as the component (B) include a latex of a styrene-butadiene copolymer, a styrene-butadiene-acryl-based copolymer, or the like; and an emulsion of a vinyl acetate resin, a vinyl acetate-acrylic acid copolymer, a styrene-acrylic ester copolymer, a polyurethane resin, or the like.

The water-soluble or water-dispersible inorganic material for use as the component (B) may be inorganic particles.

Examples of inorganic materials used to form inorganic particles include metal oxides such as silica, alumina, titania, zirconia, tin oxide, zinc oxide, and asbestos; metal salts such as calcium carbonate, zinc carbonate, barium carbonate, and calcium phosphate; minerals such as clay, mica, celite, talc, and kaolin; and metals such as aluminum and iron. These materials may be used alone or in combination of two or more to form inorganic particles. Silica is a preferred inorganic material to form the inorganic particles.

In view of the transparency of the pressure-sensitive adhesive layer, the average particle size of the inorganic particles (C) is preferably as small as possible. When the (meth)acryl-based copolymer (A) and inorganic particles are used to form a composite material, light scattering can be caused by a difference in refractive index between these materials, which becomes a cause of a decrease in transparency. In general, light with a certain wavelength is most scattered by particles with a size of half of the wavelength, but as the particle size decreases, scattering sharply decreases (in proportion to the 6th power of the particle size), so that transparency is obtained. Thus, the size of the inorganic particles is preferably smaller than half of the short wavelength (400 nm) of visible light. In the present invention, organic particles with an average particle size of 200 nm or less are preferably used. The inorganic particles preferably have an average particle size of 1 to 200 nm, more preferably 1 to 100 nm, even more preferably 1 to 50 nm.

The average particle size of the inorganic particles can be determined by the method described below from the specific surface area measured by BET method.

[Average Particle Size (Specific Surface Area Diameter)]

The inorganic particles are dried and then measured for specific surface area S (m$^2$/g) by BET method. The average particle size d (nm) of the inorganic particles is calculated from the following conversion equation: d (nm)=6000/[ρ(g/cm$^3$)×S(m$^2$/g)] (conversion equation (1)), wherein d represents the average particle size, ρ represents the density, and S represents the specific surface area. In the case of silica, a density of 2.2 (g/cm$^3$) is used in the calculation.

For example, the water-soluble or water-dispersible inorganic particles are preferably used in the form of a colloid. Colloidal silica is preferably used for the inorganic particles. Such a colloid contains inorganic particles dispersed in a dispersion medium, which form a colloidal solution. The dispersion medium is generally water. Besides water, any other dispersion medium such as an alcohol may also be used. The concentration of the solids of the inorganic particles in the colloid is generally, but not limited to, about 1 to about 50% by weight, more generally 1 to 30% by weight. A colloid containing an acid, such as nitric acid, hydrochloric acid, or acetic acid, as a stabilizer may also be used.

The water-soluble or water-dispersible inorganic material for use as the component (B) may also be an alkali silicate. In another mode, the water-soluble or water-dispersible inorganic material may be magnesium silicate.

The alkali silicate may be a salt containing an alkali metal (specifically, lithium, sodium, potassium, rubidium, cesium, or francium) oxide and silicon dioxide. Examples of the alkali silicate (B) include lithium silicate, sodium silicate, and potassium silicate.

Lithium silicate is a salt containing lithium oxide and silicon dioxide, which can be represented by formula (2) below.

$$Li_2O.n^1SiO_2 \qquad (2)$$

In the formula, $n^1$ represents an integer of more than 0. Lithium silicate can be classified according to the molar ratio between lithium oxide and silicon dioxide (namely, the value of $n^1$ in formula (2)). Examples include lithium orthosilicate ($Li_4SiO_4(Li_2O.0.5SiO_2$, $n^1=0.5$)), lithium metasilicate ($Li_2SiO_3(Li_2O.SiO_2$, $n^1=1$)), and hexalithium orthodisilicate ($Li_6Si_2O_7(Li_2O.\frac{2}{3}SiO_2$, $n^1=\frac{2}{3}$).

Besides the above, examples of lithium silicate also include $Li_4Si_7O_{16}(Li_2O.3.5SiO_2$, $n^1=3.5$), $Li_4Si_9O_{20}$  ($Li_2O.4.5SiO_2$, $n^1=4.5$), $Li_4Si_{15}O_{32}(Li_2O.7.5SiO_2$, $n^1=7.5$), etc. For example, lithium silicate may also be in the form of a hydrate ($Li_2O.n^1SiO_2.x^1H_2O$), in which the crystal water content ($x^1$ in the formula) is not restricted and may be appropriately determined depending on the intended purpose and use. For example, such a lithium silicate hydrate may be lithium metasilicate hydrate ($Li_2SiO_3.H_2O(Li_2O.SiO_2.H_2O$, $n^1=1$, $x^1=1$).

For example, lithium silicate may also be used in the form of an aqueous solution of lithium silicate. In this case, the aqueous solution typically has a solid concentration of 1 to 50% by weight, preferably 2 to 40% by weight. The solubility of lithium silicate in water varies with the molar ratio between lithium oxide and silicon dioxide (namely, the value of $n^1$ in formula (2)). For example, lithium silicate with an $n^1$ value of 2 to 5 in formula (2) is soluble in water, whereas lithium silicate with an $n^1$ value of 6 to 10 in formula (2) is insoluble in water.

Common commercially available lithium silicate may also be used, examples of which include Lithium Silicate 35 (an aqueous lithium silicate solution, $SiO_2/Li_2O$ (molar ratio)= 3.5, manufactured by Nissan Chemical Industries, Ltd.), Lithium Silicate 45 (an aqueous lithium silicate solution, $SiO_2/Li_2O$ (molar ratio)=4.5, manufactured by Nissan Chemical Industries, Ltd.), and Lithium Silicate 75 (an aqueous lithium silicate solution, $SiO_2/Li_2O$ (molar ratio)=7.5, manufactured by Nissan Chemical Industries, Ltd.).

Sodium silicate is a salt containing sodium oxide and silicon dioxide, which can be represented by formula (3) below.

$$Na_2O.n^2SiO_2 \qquad (3)$$

In the formula, $n^2$ represents an integer of more than 0. Such sodium silicate can be classified according to the molar ratio between sodium oxide and silicon dioxide (namely, the value of $n^2$ in formula (3)). Examples include sodium orthosilicate ($Na_4SiO_4(Na_2O.0.5SiO_2$, $n^2=0.5$)) and sodium metasilicate ($Na_2SiO_3(Na_2O.SiO_2$, $n^2=1$)).

Besides the above, examples of sodium silicate also include sodium silicate No. 1 ($Na_2Si_2O_5(Na_2O.2SiO_2$, $n^2=2$)), sodium silicate No. 2 ($Na_4Si_5O_{12}(Na_2O.2.5SiO_2$, $n^2=2.5$)), sodium silicate No. 3 ($Na_2Si_3O_7(Na_2O.3SiO_2$, $n^2=3$)), sodium silicate No. 4 ($Na_2Si_4O_9(Na_2O.4SiO_2$, $n^2=4$)), etc.

For example, sodium silicate may also be in the form of a hydrate ($Na_2O.n^2SiO_2.x^2H_2O$), in which the crystal water content ($x^2$ in the formula) is not restricted and may be appropriately determined depending on the intended purpose and use. For example, sodium silicate may also be used in the form of an aqueous solution of sodium silicate. In this case, the aqueous solution typically has a solid concentration of 1 to 50% by weight, preferably 2 to 40% by weight.

Common commercially available sodium silicate may also be used, examples of which include Sodium Silicate No. 1 (an aqueous sodium silicate No. 1 solution, $SiO_2/Na_2O$ (molar ratio)=1.3-2.2, manufactured by ADEKA CORPORATION or Fuji Kagaku CORP.), Sodium Silicate No. 2 (an aqueous sodium silicate No. 2 solution, $SiO_2/Na_2O$ (molar ratio)=2.2-2.6, manufactured by ADEKA CORPORATION or Fuji Kagaku CORP.), and Sodium Silicate No. 3 (an aqueous sodium silicate No. 3 solution, $SiO_2/Na_2O$ (molar ratio)=2.8-3.4, manufactured by ADEKA CORPORATION or Fuji Kagaku CORP.).

Potassium silicate is a salt containing potassium oxide and silicon dioxide, which can be represented by formula (4) below.

$$K_2O.n^3SiO_2 \qquad (4)$$

In the formula, $n^3$ represents an integer of more than 0. Such potassium silicate can be classified according to the molar ratio between potassium oxide and silicon dioxide (namely, the value of $n^3$ in formula (4)). Examples include potassium metasilicate ($K_2SiO_3(K_2O.SiO_2, n^3=1)$), etc.

Besides the above, examples of potassium silicate also include potassium silicate No. 1 ($K_2Si_2O_5(K_2O.2SiO_2, n^3=2)$), potassium silicate No. 2 ($K_4Si_7O_{16}(K_2O.3.5SiO_2, n^3=3.5)$), etc. For example, potassium silicate may also be in the form of a hydrate ($K_2O.n^3SiO_2.x^3H_2O$), in which the crystal water content ($x^3$ in the formula) is not restricted and may be appropriately determined depending on the intended purpose and use. For example, such a potassium silicate hydrate may be potassium hydrogen disilicate ($K_2Si_4O_9.H_2O$ ($K_2O.4SiO_2.H_2O$, $n^3=4$, $x^3=1$, alias: potassium tetrasilicate).

For example, potassium silicate may also be used in the form of an aqueous solution of potassium silicate. In this case, the aqueous solution typically has a solid concentration of 1 to 50% by weight, preferably 2 to 40% by weight. Common commercially available potassium silicate may also be used, examples of which include Potassium Silicate No. 1 (an aqueous potassium silicate No. 1 solution, $SiO_2/K_2O$ (molar ratio)=1.8-2.2, manufactured by Fuji Kagaku CORP.), Potassium Silicate No. 2 (an aqueous potassium silicate No. 2 solution, $SiO_2/K_2O$ (molar ratio)=3.4-3.7, manufactured by Fuji Kagaku CORP.), etc.

These alkali silicates may be used alone or in combination of two or more. The alkali silicate is preferably lithium silicate. It will be understood that if necessary, such alkali silicates may also contain a metal atom such as iron.

The aqueous dispersion-type pressure-sensitive adhesive composition for use in forming the pressure-sensitive adhesive layer of the present invention contains an aqueous dispersion of the (meth)acryl-based copolymer (A) and the water-soluble or water-dispersible component (B) in an (A)/(B) mixture ratio (solid weight ratio) of 50-97/3-50. The mixture ratio can be defined as the ratio of the weight of the solid in the aqueous dispersion of the (meth)acryl-based copolymer (A) to the weight of the solid in the water-soluble or water-dispersible component (B) when the total weight of the respective solids is normalized as 100% by weight. When the aqueous (meth)acryl-based copolymer (A) dispersion and the water-soluble or water-dispersible component (B) are used within this range, a reduction in the cohesive strength of the pressure-sensitive adhesive can be prevented, and a sufficient level of reworkability or recyclability can be provided, while it is ensured that the pressure-sensitive adhesive has sufficient adhesiveness. Specifically, the composition may contain 50 to 97% by weight of the aqueous (meth)acryl-based copolymer (A) dispersion and 3 to 50% by weight of the water-soluble or water-dispersible component (B) in such a manner that the total weight of the respective solids is 100% by weight. The content (the weight content of the solid) of the aqueous (meth)acryl-based copolymer (A) dispersion is preferably 60% by weight or more, more preferably 70% by weight or more. If the content (the weight content of the solid) of the aqueous (meth)acryl-based copolymer (A) dispersion is less than 50% by weight, the pressure-sensitive adhesive would have lower adhesiveness and be more likely to peel. On the other hand, the content (the weight content of the solid) of the aqueous (meth)acryl-based copolymer (A) dispersion is 97% by weight or less, preferably 95% by weight or less, more preferably 90% by weight or less, even more preferably 85% by weight or less, still more preferably less than 85% by weight. When the content (the weight content of the solid) of the aqueous (meth)acryl-based copolymer (A) dispersion is less than 85% by weight, an advantageous effect can be obtained even though the copolymer (A) does not have an additional monomer unit other than the alkyl(meth)acrylate and the carboxyl group-containing monomer. If the content (the weight content of the solid) of the aqueous (meth)acryl-based copolymer (A) dispersion is more than 97% by weight, the pressure-sensitive adhesive would have lower cohesive strength and be more likely to peel. When the component (B) is an organic material, the content (the weight content of the solid) of the aqueous (meth)acryl-based copolymer (A) dispersion is preferably from 60 to 97% by weight, more preferably from 70 to 90% by weight, even more preferably from 75 to 85% by weight. When the component (B) is an inorganic material, the content (the weight content of the solid) of the aqueous (meth)acryl-based copolymer (A) dispersion is preferably from 70 to 97% by weight, more preferably from 80 to 95% by weight. In the present invention, the weight of the solid of the (meth)acryl-based copolymer (A) is based on the value determined from the prepared aqueous (meth)acryl-based copolymer (A) dispersion.

For example, the aqueous dispersion-type pressure-sensitive adhesive composition for use in forming the pressure-sensitive adhesive layer of the present invention can be prepared by mixing the aqueous (meth)acryl-based copolymer (A) dispersion and the water-soluble or water-dispersible component (B).

When the water-soluble or water-dispersible component (B) is an aqueous dispersion of the (meth)acryl-based copolymer (B), the aqueous dispersion-type pressure-sensitive adhesive composition for use in forming the pressure-sensitive adhesive layer of the present invention can be prepared by forming emulsion particles of a core-shell structure including a core layer and a shell layer, in which in a single emulsion particle, the (meth)acryl-based copolymer (A) forms the shell layer, and the (meth)acryl-based copolymer (B) forms the core layer, in the emulsion particle of the core-shell structure, the core layer corresponds to a domain. The preparation can be performed by a process including first preparing an aqueous dispersion of the (meth)acryl-based copolymer (B), which is to be used to form a core layer, and then subjecting, to emulsion polymerization, a monomer component containing monomers for the (meth)acryl-based copolymer (A), so that the copolymer for a shell layer is formed. In the process of preparing the emulsion particles of the core-shell structure, an emulsion of the (meth)acryl-based copolymer (A) and an emulsion of the (meth)acryl-based copolymer (B), which are not involved in forming the core-shell structure, can be produced. In such a case, the composition may also contain an emulsion of the (meth)acryl-based copolymer (A) and an emulsion of the (meth)acryl-based copolymer (B) in addition to the emulsion particles of the core-shell structure.

The aqueous dispersion-type pressure-sensitive adhesive composition according to the present invention contains the aqueous (meth)acryl-based copolymer (A) dispersion and the water-soluble or water-dispersible component (B). For this composition, the total weight of the solids in the respective aqueous dispersions is preferably 80% by weight or more, more preferably 90% by weight or more, even more preferably 95% by weight or more, still more preferably 100% of the weight of the solids in the aqueous dispersion for the aqueous dispersion-type pressure-sensitive adhesive composition. In other words, other components may be used in addition to an aqueous dispersion of the (meth)acryl-based copolymer (A) and an aqueous dispersion of the water-soluble or water-dispersible component (B). Such an additional component is preferably used at a content of 10% by weight or less in order to suppress an adverse change in the haze of the pressure-sensitive adhesive layer.

If necessary, the composition may contain a crosslinking agent as an additional component. When the aqueous dispersion-type pressure-sensitive adhesive is an aqueous dispersion-type acryl-based pressure-sensitive adhesive, examples of the crosslinking agent that may be used include those commonly used, such as an isocyanate crosslinking agent, an epoxy crosslinking agent, an oxazoline crosslinking agent, an aziridine crosslinking agent, a carbodiimide crosslinking agent, and a metal chelate crosslinking agent. When a functional group-containing monomer is used, these crosslinking agents have the effect of reacting with the functional group incorporated in the (meth)acryl-based polymer (A) to form crosslinkage.

The content of the crosslinking agent (on solid basis) is generally, but not limited to, about 10 parts by weight or less based on 100 parts by weight of the total solids in the aqueous dispersion of the (meth)acryl-based copolymer (A) and the water-soluble or water-dispersible component (B). The content of the crosslinking agent is preferably from about 0.001 to about 10 parts by weight, more preferably from about 0.01 to about 5 parts by weight, and even more preferably from about 0.01 to about 2 parts by weight. Although the crosslinking agent can provide a cohesive strength for the pressure-sensitive adhesive layer, the use of the crosslinking agent tends to degrade adhesion and to cause moisture-induced peeling. In the present invention, therefore, the crosslinking agent is not particularly necessary.

If necessary, the aqueous dispersion pressure-sensitive adhesive of the present invention may further appropriately contain any of various additives such as viscosity adjusting agent, releasing adjusting agent, tackifiers, plasticizers, softener, fillers including glass fibers, glass beads, metal power, or any other inorganic powder, pigments, colorants (pigments, dyes or the likes), pH adjusting agent (acid or base), antioxidants, and ultraviolet ray absorbing agents, silane coupling agents, without departing from the objects of the present invention. The aqueous dispersion pressure-sensitive adhesive may also contain fine particles to form a light-diffusing pressure-sensitive adhesive layer. These additives may also be added in the form of emulsion.

The pressure-sensitive adhesive layer for an optical film of the present invention is made from the aqueous dispersion-type pressure-sensitive adhesive composition. The pressure-sensitive adhesive layer can be formed by a process including applying the aqueous dispersion-type pressure-sensitive adhesive composition to a substrate (an optical film or a release film) and then drying the adhesive.

The pressure-sensitive adhesive layer-attached optical film of the present invention includes an optical film and the pressure-sensitive adhesive layer or layers placed on one or both sides of the optical film. The pressure-sensitive adhesive layer-attached optical film of the present invention can be formed by a process including applying the aqueous dispersion-type pressure-sensitive adhesive composition to an optical film or a release film and drying the composition. When the pressure-sensitive adhesive layer is formed on a release film, the pressure-sensitive adhesive layer will be transferred and bonded to an optical film.

Various methods may be used in the applying step of the aqueous dispersion-type pressure-sensitive adhesive composition. Examples include roll coating, kiss roll coating, gravure coating, reverse coating, roll brush coating, spray coating, dip roll coating, bar coating, knife coating, air knife coating, curtain coating, lip coating, and extrusion coating using a die coater or the like.

In the applying step, the amount of the application should be controlled so that a pressure-sensitive adhesive layer with a predetermined thickness (post-drying thickness) can be formed. The thickness (post-drying thickness) of the pressure-sensitive adhesive layer is generally set within the range of about 1 μm to about 100 μm, preferably within the range of 5 μm to 50 μm, and more preferably within the range of 10 μm to 40 μm.

Subsequently, the applied aqueous dispersion-type pressure-sensitive adhesive composition is dried to form a pressure-sensitive adhesive layer. The drying temperature is generally from about 80 to about 170° C., preferably from 80 to 160° C., and the drying time period is generally from about 0.5 to about 30 minutes, preferably from 1 to 10 minutes.

The pressure-sensitive adhesive layer of the present invention for an optical film contains the component (B) and a resin component made of the (meth)acryl-based copolymer (A), wherein the component (B) forms domains with maximum lengths between 1 mm and 200 nm in the resin component. If the maximum domain length is less than 1 nm, a low adhesive strength cannot be provided at a high peeling rate, and reworkability and recyclability would be poor. If the maximum domain length is more than 200 nm, the pressure-sensitive adhesive layer would have higher haze and cause depolarization, which makes it difficult to use the pressure-sensitive adhesive layer in optical applications. From these points of view, the maximum domain length is preferably from 5 to 150 nm, more preferably from 10 to 100 nm.

The domain size can be controlled based on the component (B), and when the water-soluble or water-dispersible inorganic material is used as the component (B) (for example, when the inorganic particles or the like are used), the size of the inorganic particles can be reflected in the domain size. On the other hand, when the water-soluble or water-dispersible organic material (polymer) is used as the component (B) (for example, when an aqueous dispersion of the (meth)acryl-based copolymer (B) is used), the particle size of the aqueous (meth)acryl-based copolymer (B) dispersion can be reflected in the domain size. When the component (B) is the water-soluble resin, the domain size and viscosity decrease as the molecular weight of the water-soluble resin decreases, which means that the domain size can be controlled by the molecular weight and the viscosity.

Domains with maximum lengths between 1 nm and 200 nm preferably make up 98% or more, more preferably 100% of the domains made of the component (B). This means that when domains with maximum lengths between 1 nm and 200 nm are identified and counted, exceptional extremely large domains are avoided.

The maximum domain length is determined as follows. Three arbitrary parts are photographed using a transmission electron microscope (TEM) (the size of each photographed image: 300 nm×300 nm to 5,000 nm×5,000 nm). The largest domain is determined in each photograph, and the longest domain is selected from the largest domains in the three photographs. The maximum domain length is defined as the length of the selected longest domain. To avoid extremely large domains, TEM images showing at least three domains of 1 nm to 200 nm are employed, whereas those showing at most two domains of 1 nm to 200 nm are not employed.

When having a thickness of 20 μm, the pressure-sensitive adhesive layer for an optical film according of the present invention has a haze value (H20) of 1% or less, and satisfies a haze value (H20) of 0 to 1%, which has the transparency required of pressure-sensitive adhesive layer-attached optical films. The haze value (H20) is preferably from 0 to 0.8%, and more preferably from 0 to 0.5%. If the haze value (H20) is more than 1%, depolarization would occur, which is not preferred for optical film applications.

It is preferred that the ratio (H200)/(H20) of the haze value (H200) of the pressure-sensitive adhesive layer with a thickness of 200 μm to the haze value (H20) should be 2 or less, so that the transparency required of the pressure-sensitive adhesive layer-attached optical film can be provided. The ratio (H200)/(H20) is preferably 1.5 or less.

The pressure-sensitive adhesive layer of the present invention for an optical film can have an adhesive strength of 1 to 15 N/25 mm to glass at a peeling rate of 300 mm/minute during a storage period of 30 days or less at a temperature of 23° C. after the pressure-sensitive adhesive layer is bonded to glass. The pressure-sensitive adhesive layer with an adhesive strength of 1 to 15 N/25 mm is preferred to maintain the adhesive strength to glass and to provide a sufficient level of durability. The adhesive strength is preferably from 2 to 10 N/25 mm, more preferably from 4 to 10 N/25 mm. Specifically, the pressure-sensitive adhesive layer with an adhesive strength of 4 N/25 mm or more can be evaluated to have the best moisture resistance. When the adhesive strength is 10 N/25 mm or less, the adhesive residue level can also be good. The pressure-sensitive adhesive layer should have such a level of adhesive strength to glass in view of reworkability.

The pressure-sensitive adhesive layer of the present invention for an optical film can have an adhesive strength of 1 to 25 N/25 mm to glass at a peeling rate of 300 mm/minute after the pressure-sensitive adhesive layer is bonded to glass and stored at a temperature of 60° C. for a time period of 1,000 hours. The pressure-sensitive adhesive layer with an adhesive strength of 1 to 25 N/25 mm is preferred to maintain the adhesive strength to glass and to provide a sufficient level of durability. The adhesive strength is preferably from 1 to 20 N/25 mm, more preferably from 1 to 18 N/25 mm. Specifically, the pressure-sensitive adhesive layer with an adhesive strength exceeding 10 N/25 mm can be evaluated to be the best. When the adhesive strength is 18 N/25 mm or less, the adhesive residue level can also be good. The pressure-sensitive adhesive layer should have such a level of adhesive strength in view of recyclability.

When stored under different conditions for the reworkability or the recyclability, the pressure-sensitive adhesive layer of the present invention for an optical film can have an adhesive strength to glass at a peeling rate exceeding 300 mm/minute which is equal to or less than the above specified value at a peeling rate of 300 mm/minute. Conventional pressure-sensitive adhesive layers cannot undergo a reworking process at a high peeling rate because they increase in adhesive strength with increasing peeling rate. In contrast, the pressure-sensitive adhesive layer of the present invention for an optical film can undergo a reworking or recycling process at a high peeling rate because it can decrease in adhesive strength with increasing peeling rate when the peeling rate exceeds 300 mm/minute.

As described above, the pressure-sensitive adhesive layer of the present invention for an optical film has good reworkability or recyclability at high peeling rate. Thus, after bonded to a glass substrate, the pressure-sensitive adhesive layer-attached optical film having the pressure-sensitive adhesive layer of the present invention can be removed from the glass substrate at a high peeling rate for reworking. The pressure-sensitive adhesive layer can be removed generally at a peeling rate of more than 300 mm/minute, preferably at a peeling rate of 500 mm/minute or more. As described above, the pressure-sensitive adhesive layer can have a low adhesive strength at such peeling rates, so that a reworking process can be successfully performed. There is no particular upper limit to the peeling rate. In general, a peeling rate of 30 m/minute or less is used.

Examples of the material used to form the release film include a plastic film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A plastic film is preferably used, because of its good surface smoothness.

Any plastic film capable of protecting the pressure-sensitive adhesive layer may be used, examples of which include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release film is generally from about 5 to about 200 μm, preferably from about 5 to about 100 μm. If necessary, the separator may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the release film is appropriately subjected to a release treatment such as a silicone treatment, a long-chain alkyl treatment, or a fluorine treatment, the releasability from the pressure-sensitive adhesive layer can be further increased.

The pressure-sensitive adhesive layer may be exposed. In such a case, the pressure-sensitive adhesive layer may be protected by the release film until it is actually used. The release film may be used as is as a separator for a pressure-sensitive adhesive layer-attached optical film, so that the process can be simplified.

An optical film may also be coated with an anchor layer or subjected to any adhesion-facilitating treatment such as a corona treatment or a plasma treatment so as to have improved adhesion to a pressure-sensitive adhesive layer, and then the pressure-sensitive adhesive layer may be formed. The surface of the pressure-sensitive adhesive layer may also be subjected to an adhesion-facilitating treatment.

Materials that may be used to form the anchor layer preferably include an anchoring agent selected from polyurethane, polyester, polymers containing an amino group in the molecule, and polymers containing an oxazolinyl group in the molecule, in particular, preferably polymers containing an amino group in the molecule and polymers containing an oxazolinyl group in the molecule. Polymers containing an amino group in the molecule and polymers containing an oxazolinyl group in the molecule allow the amino group in the molecule or an oxazolinyl group in the molecule to react with a carboxyl group or the like in the pressure-sensitive adhesive or to make an interaction such as an ionic interaction, so that good adhesion can be ensured.

Examples of polymers containing an amino group in the molecule include polyethyleneimine, polyallylamine, polyvinylamine, polyvinylpyridine, polyvinylpyrrolidine, and a polymer of an amino group-containing monomer such as dimethylaminoethyl acrylate.

The optical film is, but not limited to the kinds, used for forming image display device such as liquid crystal display. A polarizing plate is exemplified. A polarizing plate including a polarizer and a transparent protective film provided on one side or both sides of the polarizer is generally used.

A polarizer is, but not limited to, various kinds of polarizer may be used. As a polarizer, for example, a film that is uniaxially stretched after having dichromatic substances, such as iodine and dichromatic dye, absorbed to hydrophilic polymer films, such as polyvinyl alcohol-based film, partially formalized polyvinyl alcohol-based film, and ethylene-vinyl acetate copolymer-based partially saponified film; polyene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Thickness of polarizer is, but not limited to, generally about 80 µm or less.

A polarizer that is uniaxially stretched after a polyvinyl alcohol-based film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

An optical film may be exemplified as other optical layers, such as a reflective plate, a transflective plate, a retardation plate (a half wavelength plate and a quarter wavelength plate included), a viewing angle compensation film, a brightness enhancement film, a surface treatment film or the like, which may be used for formation of a liquid crystal display etc. These are used in practice as an optical film, or as one layer or two layers or more of optical layers laminated with polarizing plate.

The surface treatment film may also be provided on and bonded to a front face plate. Examples of the surface treatment film include a hard-coat film for use in imparting scratch resistance to the surface, an antiglare treatment film for preventing glare on image display devices, and an anti-reflection film such as an anti-reflective film or a low-reflective film, etc. The front face plate is provided on and bonded to the surface of an image display device such as a liquid crystal display device, an organic EL display device, a CRT, or a PDP to protect the image display device or to provide a high-grade appearance or a differentiated design. The front face plate is also used as a support for a λ/4 plate in a 3D-TV. In a liquid crystal display device, for example, the front face plate is provided above a polarizing plate on the viewer side. When the pressure-sensitive adhesive layer according to the present invention is used, the same effect can be produced using a plastic base material such as a polycarbonate or poly(methyl methacrylate) base material for the front face plate, as well as using a glass base material.

Although an optical film with the above described optical layer laminated to the polarizing plate may be formed by a method in which laminating is separately carried out sequentially in manufacturing process of a liquid crystal display device or the like, an optical film in a form of being laminated beforehand has an outstanding advantage that it has excellent stability in quality and assembly workability, and thus manufacturing processes ability of a liquid crystal display device or the like may be raised. Proper adhesion means, such as a pressure-sensitive adhesive layer, may be used for laminating. On the occasion of adhesion of the above described polarizing plate and other optical films, the optical axis may be set as a suitable configuration angle according to the target retardation characteristics or the like.

The pressure-sensitive adhesive layer-attached optical film of the present invention is preferably used to form various types of image display devices such as liquid crystal display devices. Liquid crystal display devices may be produced according to conventional techniques. Specifically, liquid crystal display devices are generally produced by appropriately assembling a liquid crystal cell or the likes and the pressure-sensitive adhesive layer-attached optical film and optionally other components such as a lighting system and incorporating a driving circuit according to any conventional technique, except that the pressure-sensitive adhesive layer-attached optical film of the present invention is used. Any type of liquid crystal cell may also be used such as a TN type, an STN type, a π type, a VA type and an IPS type.

Suitable liquid crystal display devices, such as liquid crystal display device with which the above pressure-sensitive adhesive layer-attached optical film has been provided on one side or both sides of the display panel such as a liquid crystal cell, and with which a backlight or a reflective plate is used for a lighting system may be manufactured. In this case, the pressure-sensitive adhesive layer-attached optical film of the present invention may be provided on one side or both sides of the display panel such as a liquid crystal cell. When providing the pressure-sensitive adhesive layer-attached optical films on both sides, they may be of the same type or of different type. Furthermore, in assembling a liquid crystal display device, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display device: OLED) will be explained. Generally, in organic EL display device, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer including triphenylamine derivatives etc., a luminescence layer including fluorescent organic solids, such as anthracene; a laminated material of electronic injection layer including such a luminescence layer and perylene derivatives, etc.; laminated material of these hole injection layers, luminescence layer, and electronic injection layer etc.

An organic EL display device emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display device, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display device of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display device looks like mirror if viewed from outside.

In an organic EL display device containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display device is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

Hereinafter, the present invention is more specifically described with reference to the examples, which however are not intended to limit the present invention. In each example, "parts" and "%" are all by weight.

(Preparation of Monomer Emulsion (1a))

To a vessel were added 900 parts of methyl methacrylate, 80 parts of butyl acrylate, and 20 parts of acrylic acid as raw materials and mixed to form a monomer mixture. Subsequently, 8 parts of AQUALON HS-10 (manufactured by Dai-ichi Kogyo Seiyaku Co., Ltd.) as a reactive surfactant (anionic) and 127 parts of ion-exchanged water were added to 200 parts of the monomer mixture prepared with the above composition, and stirred at 6,000 (rpm) for 5 minutes using a homomixer (manufactured by PRIMIX Corporation), so that a monomer emulsion (1a) was obtained.

(Preparation of Monomer Emulsion (1b))

A monomer emulsion (1b) was obtained as in Preparation of Monomer Emulsion (1a), except that a monomer mixture of 750 parts of methyl methacrylate, 230 parts of butyl acrylate, and 20 parts of acrylic acid was used instead.

(Preparation of Monomer Emulsion (1c))

A monomer emulsion (1c) was obtained as in Preparation of Monomer Emulsion (1a), except that a monomer mixture of 800 parts of methyl methacrylate, 180 parts of butyl acrylate, and 20 parts of acrylic acid was used instead.

(Preparation of Monomer Emulsion (1d))

A monomer emulsion (1d) was obtained as in Preparation of Monomer Emulsion (1a), except that a monomer mixture of 100 parts of methyl methacrylate, 880 parts of butyl acrylate, and 20 parts of acrylic acid was used instead.

(Preparation of Monomer Emulsion (1e))

A monomer emulsion (1e) was obtained as in Preparation of Monomer Emulsion (1a), except that a monomer mixture of 400 parts of methyl methacrylate, 580 parts of butyl acrylate, and 20 parts of acrylic acid was used instead.

(Preparation of Monomer Emulsion (2a))

To a vessel were added 949.5 parts of butyl acrylate, 50 parts of acrylic acid, and 0.5 parts of 3-methacryloyloxypropyl-trimethoxysilane (KBM-503, manufactured by Shin-Etsu Chemical Co., Ltd.) as raw materials and mixed to form a monomer mixture. Subsequently, 24 parts of AQUALON HS-10 (manufactured by Dai-ichi Kogyo Seiyaku Co., Ltd.) as a reactive surfactant (anionic) and 381 parts of ion-exchanged water were added to 600 parts of the monomer mixture prepared with the above composition, and stirred at 6,000 (rpm) for 5 minutes using a homomixer (manufactured by PRIMIX Corporation), so that a monomer emulsion (2a) was obtained.

(Preparation of Monomer Emulsion (2b))

A monomer emulsion (2b) was obtained as in Preparation of Monomer Emulsion (2a), except that a monomer mixture of 949.9 parts of methyl methacrylate, 50 parts of acrylic acid, and 0.1 parts of 3-methacryloyloxypropyl-trimethoxysilane (KBM-503, manufactured by Shin-Etsu Chemical Co., Ltd.) was used instead.

(Preparation of Monomer Emulsion (2c))

A monomer emulsion (2c) was obtained as in Preparation of Monomer Emulsion (2a), except that a monomer mixture of 300 parts of methyl methacrylate, 679.7 parts of butyl acrylate, 20 parts of acrylic acid, and 0.3 parts of 3-methacryloyloxypropyl-trimethoxysilane (KBM-503, manufactured by Shin-Etsu Chemical Co., Ltd.) was used instead.

(Preparation of Monomer Emulsion (2d))

A monomer emulsion (2d) was obtained as in Preparation of Monomer Emulsion (2a), except that a monomer mixture of 200 parts of methyl methacrylate, 779.7 parts of butyl acrylate, 20 parts of acrylic acid, and 0.3 parts of 3-methacryloyloxypropyl-trimethoxysilane (KEN-503, manufactured by Shin-Etsu Chemical Co., Ltd.) was used instead.

(Preparation of Monomer Emulsion (2e))

A monomer emulsion (2e) was obtained as in Preparation of Monomer Emulsion (2a), except that a monomer mixture of 100 parts of methyl methacrylate, 879.7 parts of butyl acrylate, 20 parts of acrylic acid, and 0.3 parts of 3-methacryloyloxypropyl-trimethoxysilane (KBM-503, manufactured by Shin-Etsu Chemical Co., Ltd.) was used instead.

(Preparation of Monomer Emulsion (3))

To a vessel were added 950 parts of butyl acrylate, and 50 parts of acrylic acid as raw materials and mixed to form a monomer mixture. Subsequently, 24 parts of AQUALON HS-10 (manufactured by Dai-ichi Kogyo Seiyaku Co., Ltd.) as a reactive surfactant (anionic) and 382 parts of ion-exchanged water were added to 600 parts of the monomer mixture prepared with the above composition, and stirred at 6,000 (rpm) for 5 minutes using a homomixer (manufactured by PRIMIX Corporation), so that a monomer emulsion (3) was obtained.

Example 1

(Preparation of Aqueous Dispersion-Type Pressure-Sensitive Adhesive Composition)

To a reaction vessel equipped with a condenser tube, a nitrogen-introducing tube, a thermometer, a dropping funnel, and a stirring blade were added 200 parts of the monomer emulsion (1a) prepared as described above and 330 parts of ion-exchanged water. Subsequently, after the space in the reaction vessel was replaced with nitrogen gas sufficiently, 0.6 parts of ammonium persulfate was added to the vessel, and the mixture was subjected to polymerization at 60° C. for 1 hour with stirring, so that a copolymer for forming a core layer was obtained. Subsequently, 800 parts of the monomer emulsion (2a) was added dropwise to the reaction vessel over 3 hours, while the reaction vessel was kept at 60° C. The mixture was then subjected to polymerization for 3 hours to form a shell layer, so that an aqueous dispersion with a solid concentration of 46.0% containing polymer emulsion particles of a core-shell structure was obtained. Subsequently, after the aqueous dispersion containing polymer emulsion particles was cooled to room temperature, 10% ammonia water was added thereto to adjust the pH and the solid concentration to 8 and 46.2%, respectively, so that an aqueous dispersion-type pressure-sensitive adhesive composition containing emulsion particles of a core-shell structure was obtained.

(Formation of Pressure-Sensitive Adhesive Layer and Preparation of Pressure-Sensitive Adhesive Layer-Attached Optical Polarizing Plate)

The aqueous dispersion-type pressure-sensitive adhesive composition was applied to a release film (Diafoil MRF-38, manufactured by Mitsubishi Chemical Polyester Co., Ltd., a polyethylene terephthalate backing) with a die coater so that a 20 μm thick coating could be formed after drying, and then the coating was dried at 120° C. for 5 minutes to form a pressure-sensitive adhesive layer. The pressure-sensitive adhesive layer was bonded to a polarizing plate (SEG-DU (product name) manufactured by NITTO DENKO CORPORATION), so that a pressure-sensitive adhesive layer-attached optical polarizing plate was obtained.

Examples 2 to 12

Aqueous dispersion-type pressure-sensitive adhesive compositions, pressure-sensitive adhesive layers, and pressure-sensitive adhesive layer-attached polarizing plates were obtained as in Example 1, except that at least one of the type of the monomer emulsion used to form the copolymer (A) for the core layer, the type of the monomer emulsion used to form the component (B) for the shell layer, and the ratio of the copolymer (A) to the component (B) was changed as shown in Table 1 in the preparation of the aqueous dispersion-type pressure-sensitive adhesive compositions.

Example 13

(Preparation of (Meth)Acryl-Based Copolymer Emulsion (A1))

To a reaction vessel equipped with a condenser tube, a nitrogen-introducing tube, a thermometer, a dropping funnel, and a stirring blade were added 200 parts of a portion of the prepared monomer emulsion (3) and 330 parts of ion-exchanged water. Subsequently, after the space in the reaction vessel was replaced with nitrogen gas sufficiently, 0.6 parts of ammonium persulfate was added to the vessel, and the mixture was subjected to polymerization at 60° C. for 1 hour with stirring. Subsequently, the remaining portion of the monomer emulsion was added dropwise to the reaction vessel over 3 hours, while the reaction vessel was kept at 60° C. The mixture was then subjected to polymerization for 3 hours to give a polymer emulsion with a solid concentration of 46.0%. Subsequently, after the polymer emulsion was cooled to room temperature, 10% ammonia water was added thereto to adjust the pH and the solid concentration to 8 and 46.0%, respectively, so that a (meth)acryl-based copolymer emulsion (A1) was obtained.

(Preparation of (Meth)Acryl-Based Copolymer Emulsion (B1))

To a reaction vessel equipped with a condenser tube, a nitrogen-introducing tube, a thermometer, a dropping funnel, and a stirring blade were added 200 parts of a portion of the monomer emulsion (1a) prepared in Example 1 and 330 parts of ion-exchanged water. Subsequently, after the space in the reaction vessel was replaced with nitrogen gas sufficiently, 0.6 parts of ammonium persulfate was added to the vessel, and the mixture was subjected to polymerization at 60° C. for 1 hour with stirring. Subsequently, the remaining portion of the monomer emulsion was added dropwise to the reaction vessel over 3 hours, while the reaction vessel was kept at 60° C. The mixture was then subjected to polymerization for 3 hours to give a polymer emulsion with a solid concentration of 45.8%. Subsequently, after the polymer emulsion was cooled to room temperature, 10% ammonia water was added thereto to adjust the pH and the solid concentration to 8 and 45.8%, respectively, so that a (meth)acryl-based copolymer emulsion (B1) was obtained.

(Preparation of Aqueous Dispersion-Type Pressure-Sensitive Adhesive Composition)

The (meth)acryl-based copolymer emulsion (A1) and the (meth)acryl-based copolymer emulsion (B1) were mixed in such a manner that the ratio of the solid weight of the emulsion (A1) to the solid weight of the emulsion (B1) (the mixture ratio (A1)/(B1)) was 90/10, so that an aqueous dispersion-type pressure-sensitive adhesive composition was obtained.

(Preparation of Pressure-Sensitive Adhesive Layer and Pressure-Sensitive Adhesive Layer-Attached Polarizing Plate)

Using the aqueous dispersion-type pressure-sensitive adhesive composition, a pressure-sensitive adhesive layer and a pressure-sensitive adhesive layer-attached polarizing plate were obtained as in Example 1.

Examples 14 and 15

Aqueous dispersion-type pressure-sensitive adhesive compositions, pressure-sensitive adhesive layers, and pressure-sensitive adhesive layer-attached polarizing plates were obtained as in Example 13, except that the mixture ratio of the (meth)acryl-based copolymer emulsion (A1) to the (meth)acryl-based copolymer emulsion (B1) was changed as shown in Table 1 in the preparation of the aqueous dispersion-type pressure-sensitive adhesive compositions.

Example 16

(Preparation of Aqueous Solution of Water-Soluable Resin)

To a vessel were added 900 parts of acrylic acid and 100 parts of methyl methacrylate as raw materials, and 20 parts of octyl thioglycolate (OTG (trade name) manufactured by YODO KAGAKU CO., LTD.) as a chain transfer agent to form a monomer mixture. Subsequently, 520 parts of ion-exchanged water was added to a reaction vessel equipped with a condenser tube, a nitrogen-introducing tube, a thermometer, a dropping funnel, and a stirring blade. After the air in the reaction vessel was sufficiently replaced by nitrogen gas, 0.6 parts of ammonium persulfate was added to the reaction vessel. Subsequently, 400 parts of the monomer mixture was uniformly added dropwise to the reaction vessel over 2 hours with stirring, while the reaction vessel was kept at 60° C. The mixture was further subjected to polymerization at 60° C. for 2 hours so that the reaction was completed. Subsequently, after the reaction product was cooled to room temperature, 28% ammonia water was added to the reaction product to adjust its pH to 8, and the solid concentration of the product was adjusted to 40.1%, so that a water-soluble resin (aqueous solution) was obtained.

(Preparation of Aqueous Dispersion-Type Pressure-Sensitive Adhesive Composition)

An aqueous dispersion-type pressure-sensitive adhesive composition was obtained by mixing the (meth)acryl-based copolymer emulsion (A1) prepared in Example 13 and the water-soluble resin (aqueous solution) prepared as described above for the component (B) in such a manner that the mixture ratio of the solid weight of the former to the solid weight of the latter was 95/5.

(Preparation of Pressure-Sensitive Adhesive Layer and Pressure-Sensitive Adhesive Layer-Attached Polarizing Plate)

Using the aqueous dispersion-type pressure-sensitive adhesive composition, a pressure-sensitive adhesive layer and a pressure-sensitive adhesive layer-attached polarizing plate were obtained as in Example 1.

Examples 17 to 19

Aqueous dispersion-type pressure-sensitive adhesive compositions, pressure-sensitive adhesive layers, and pressure-sensitive adhesive layer-attached polarizing plates were obtained as in Example 16, except that the mixture ratio of the (meth)acryl-based copolymer emulsion (A1) to the component (B) was changed as shown in Table 1 in the preparation of the aqueous dispersion-type pressure-sensitive adhesive compositions.

Example 20

(Preparation of (Meth)Acryl-Based Copolymer Emulsion (A2))

To a reaction vessel equipped with a condenser tube, a nitrogen-introducing tube, a thermometer, a dropping funnel, and a stirring blade were added 200 parts of a portion of the prepared monomer emulsion (2a) and 330 parts of ion-exchanged water. Subsequently, after the space in the reaction vessel was replaced with nitrogen gas sufficiently, 0.6 parts of ammonium persulfate was added to the vessel, and the mixture was subjected to polymerization at 60° C. for 1 hour with stirring. Subsequently, the remaining portion of the monomer emulsion was added dropwise to the reaction vessel over 3 hours, while the reaction vessel was kept at 60° C. The mixture was then subjected to polymerization for 3 hours to give a polymer emulsion with a solid concentration of 46.0%. Subsequently, after the polymer emulsion was cooled to room temperature, 10% ammonia water was added thereto to adjust the pH and the solid concentration to 8 and 46.0%, respectively, so that a (meth)acryl-based copolymer emulsion (A2) was obtained.

(Preparation of Aqueous Dispersion-Type Pressure-Sensitive Adhesive Composition)

An aqueous dispersion-type pressure-sensitive adhesive composition was obtained by mixing the (meth)acryl-based copolymer emulsion (A2) and colloidal silica (SNOWTEX 20 (trade name) manufactured by Nissan Chemical Industries, Ltd.) as an inorganic material for the component (B) in such a manner that the mixture ratio of the solid weight of the former to the solid weight of the latter was 95/5.

(Preparation of Pressure-Sensitive Adhesive Layer and Pressure-Sensitive Adhesive Layer-Attached Polarizing Plate)

Using the aqueous dispersion-type pressure-sensitive adhesive composition, a pressure-sensitive adhesive layer and a pressure-sensitive adhesive layer-attached polarizing plate were obtained as in Example 1.

Examples 21 to 30

Aqueous dispersion-type pressure-sensitive adhesive compositions, pressure-sensitive adhesive layers, and pressure-sensitive adhesive layer-attached polarizing plates were obtained as in Example 20, except that at least one of the type of the inorganic material for the component (B) and the mixture ratio of the (meth)acryl-based copolymer emulsion (A2) to the component (B) was changed as shown in Table 1 in the preparation of the aqueous dispersion-type pressure-sensitive adhesive compositions.

Comparative Examples 1, 2 and 5

(Preparation of Aqueous Dispersion-Type Pressure-Sensitive Adhesive Composition)

Aqueous dispersion-type pressure-sensitive adhesive compositions were obtained as in Example 16, except that the inorganic material shown in Table 1 was used in place of the water-soluble resin (aqueous solution) and that the mixture ratio shown in Table 1 was used. In Comparative Example 2, only the (meth)acryl-based copolymer emulsion (A1) prepared in Example 13 was used as the aqueous dispersion-type pressure-sensitive adhesive composition. In Comparative Example 5, an aqueous dispersion of glass beads with a solid content of 45% was prepared using a homomixer in advance, and the aqueous dispersion-type pressure-sensitive adhesive composition was obtained by uniformly mixing and dispersing the resulting aqueous dispersion with the (meth)acryl-based copolymer emulsion (A1).

(Preparation of Pressure-Sensitive Adhesive Layer and Pressure-Sensitive Adhesive Layer-Attached Polarizing Plate)

Using the aqueous dispersion-type pressure-sensitive adhesive composition, a pressure-sensitive adhesive layer and a pressure-sensitive adhesive layer-attached polarizing plate were obtained as in Example 1.

Comparative Examples 3 and 4

Aqueous dispersion-type pressure-sensitive adhesive compositions, pressure-sensitive adhesive layers, and pressure-sensitive adhesive layer-attached polarizing plates were obtained as in Example 1, except that at least one of the type of the monomer emulsion used to form the copolymer (A) for the core layer, the type of the monomer emulsion used to form the component (B) for the shell layer, and the ratio of the copolymer (A) to the component (B) was changed as shown in Table 1 in the preparation of the aqueous dispersion-type pressure-sensitive adhesive compositions.

Table 1 shows the glass transition temperatures (theoretical values based on the FOX equation) of the (meth)acryl-based copolymer emulsions prepared in each Examples. Table 1 also shows each kind of the monomer emulsion, the monomer components and the contents (% by weight) of the monomer components used for each copolymer emulsions. The glass transition temperature of the inorganic materials shown as the component (B) was not able to be measured by differential scanning calorimetry (DSC), which can measure the temperature up to 300° C. Thus, the inorganic materials are assumed to have a glass transition temperature of 300° C. or more. In general, colloidal silica or an alkali silicate (water glass) has a glass transition temperature of 500 to 800° C. as measured by thermomechanical analysis (TMA).

The pressure-sensitive adhesive layer-attached polarizing plates obtained in the examples and the comparative examples were evaluated as described below. The evaluation results are shown in Tables 2 to 4.

[Determination of Domain Size]

Only the pressure-sensitive adhesive layer was taken out of the pressure-sensitive adhesive layer-attached polarizing plate and dyed with iodine and ruthenic acid. The dyed pressure-sensitive adhesive layer was sliced into 80-nm-thick ultrathin section samples with a microtome. The prepared samples were observed with H-7650, a transmission electron microscope (TEM) manufactured by Hitachi High-Technologies Corporation. Parts more densely dyed with ruthenium were determined to be domains, and parts relatively lightly dyed with ruthenium were determined to be (meth)acryl-based copolymer emulsion particles. The resulting image was processed into a photograph using image processing software, and the maximum domain length was determined from the photograph. The results are shown in Table 2.

The maximum domain length was determined as follows. Three arbitrary parts were photographed using the transmission electron microscope (TEM), and the largest domain was determined in each photograph. The longest domain was selected from the largest domains in the three photographs, and the maximum domain length was defined as the length of the selected longest domain. Exceptional extremely large domains were omitted when the maximum domain length was determined. For this purpose, TEM images showing at least three domains of 1 nm to 200 nm were employed, whereas those showing at most two domains of 1 nm to 200 nm were not employed.

Figure 7:
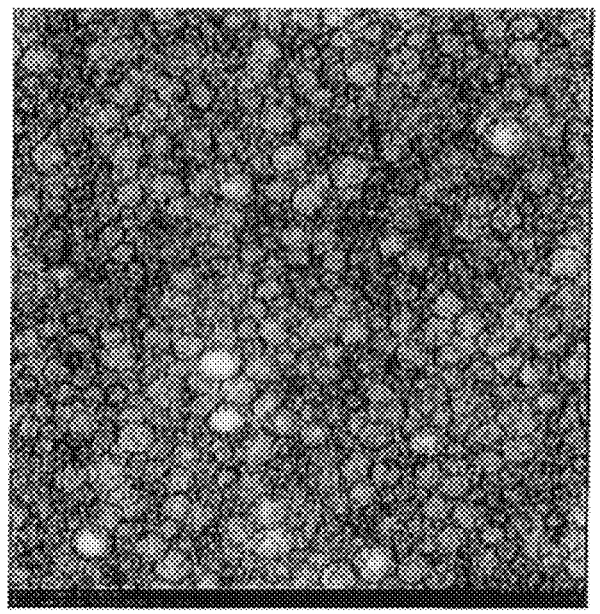
FIG. 7 is a TEM image of a pressure-sensitive adhesive layer of Comparative Example 2 according to the present invention.

FIGS. 1 to 7 show photographs used to determine the maximum domain length. FIG. 1 (photograph size: 355 nm×355 nm) was used for Example 1, FIG. 2 (photograph size: 1,550 nm×1,550 nm) for Example 2, FIG. 3 (photograph size: 610 nm×610 nm) for Example 14, FIG. 4 (photograph size: 610 nm×610 nm) for Example 16, FIG. 5 (photograph size: 610 nm×610 nm) for Example 24, FIG. 6 (photograph size: 1,590 nm×1,590 nm) for Comparative Example 1, and FIG. 7 (photograph size: 2,770 nm×2,770 nm) for Comparative Example 2. FIG. 1 is a 3D-TEM image showing emulsion particles of a core-shell structure obtained in Example 1. The core layer (domain) is indicated by MMA, and the shell layer by BA. The 3D-TEM photograph was also obtained using H-7650 manufactured by Hitachi High-Technologies Corporation. For the TEM photograph image, tilt TEM images were continuously taken every 1° from −60° to +60°. The resulting images were subjected to position correction according to Fiducial marker method and then three-dimensionally reconstructed into the 3D-TEM photograph using reconstruction software. In FIGS. 2 to 6, dark black parts correspond to domains of the component (B). FIG. 7 shows that emulsion particles were only observed. It is apparent from FIGS. 1 to 5 that in the pressure-sensitive adhesive layer of each example according to the present invention, domains with maximum lengths between 1 nm and 200 nm make up 98% or more of the domains.

[Moisture Resistance]

The pressure-sensitive adhesive layer-attached optical polarizing plate of each of the examples and the comparative examples was cut into a 15 inch size piece, which was bonded to a 0.7 mm thick non-alkali glass plate (Corning Eagle XG, manufactured by Corning Incorporated) and allowed to stand for 15 minutes in an autoclave at 50° C. and 0.5 MPa. Subsequently, it was treated under an environment at 60° C. and 90% R.H. for 500 hours. Immediately after it was taken out of the environment and transferred to room temperature conditions (23° C. and 55% R.H.), the degree of peeling between the treated pressure-sensitive adhesive layer-attached optical polarizing plate and the non-alkali glass was visually observed and evaluated according to the criteria below. The results are shown in Table 2.

5: No peeling occurred.

4: Peeling occurred from the end of the pressure-sensitive adhesive layer-attached optical polarizing plate to a site within 0.3 mm from the end.

3: Peeling occurred from the end of the pressure-sensitive adhesive layer-attached optical polarizing plate to a site within 1.0 mm from the end.

2: Peeling occurred from the end of the pressure-sensitive adhesive layer-attached optical polarizing plate to a site within 3.0 mm from the end.

1: Peeling occurred from the end of the pressure-sensitive adhesive layer-attached optical polarizing plate to a site 3.0 mm or more from the end.

[Haze]

The 20 μm thick pressure-sensitive adhesive layer obtained in each of the examples, which was formed on the release film, was cut into a size of 50 mm×50 mm. A pressure-sensitive adhesive layer was also formed as in each example described above, except that the thickness of the pressure-sensitive adhesive was changed to 200 μm, and the resulting pressure-sensitive adhesive layer was cut into a size of 50 mm×50 nm. Each pressure-sensitive adhesive layer was peeled off from the release film and measured, in the atmosphere of 25° C., for haze (%) using HAZE METER HM-150 manufactured by Murakami Color-Research Laboratory according to JIS K 7136. Table 2 shows the haze value (H20) of the 20 μm thick pressure-sensitive adhesive layer, the haze value (H200) of the 200 μm thick pressure-sensitive adhesive layer, and the ratio (H200)/(H20).

[Reworkability]

The pressure-sensitive adhesive layer-attached polarizing plate obtained in each of the examples and the comparative examples was cut into a piece of 25 mm wide and 150 mm long. The cut piece was bonded to a 0.7-mm-thick, non-alkali glass plate (Corning Eagle XG manufactured by Corning Incorporated) and stored in an autoclave at 50° C. and 0.5 MPa for 15 minutes. The cut piece was then allowed to stand in an environment at 23° C. and 50% R.H. for 2 weeks. Thereafter, adhesive strength (N/25 mm) of each of the cut pieces was measured when it was peeled off from the glass plate at a peeling angle of 180° and at each of different peeling rates (300 mm/minute, 1 m/minute, and 30 m/minute). A high-speed peeling tester (High-Low Temperature Peel Strength Tester manufactured by KOUKEN CO., LTD.) was used at a peeling rate of 20 m/minute or less, and another high-speed peeling tester (TE-702 manufactured by TESTER SANGYO CO., LTD.) was used at a peeling rate of more than 20 m/minute. The adhesive strength was evaluated using five measurements. After the cut piece was peeled off, the level of adhesive residue on the non-alkali glass surface was visually rated on a scale of 1 to 5 as shown below. The results are shown in Table 3.

5: No adhesive residue is left on the glass surface.
4: A very thin trace of adhesive residue is left on part of the glass surface.
3: A very thin trace of adhesive residue is left over the glass surface.
2: Thin adhesive residues are left over the glass surface.
1: The pressure-sensitive adhesive layer is left over the glass surface, and cohesive failure occurs in the pressure-sensitive adhesive layer.

[Recyclability]

The pressure-sensitive adhesive layer-attached polarizing plate obtained in each of the examples and the comparative examples was cut into a piece of 25 mm wide and 150 mm long. The cut piece was bonded to a 0.7-mm-thick, non-alkali glass plate (Corning Eagle XG manufactured by Corning Incorporated) and stored in an autoclave at 50° C. and 0.5 MPa for 15 minutes. The cut piece was further stored at 60° C. for 1,000 hours and then allowed to stand in an environment at 23° C. and 50% R.H. for 3 hours. Thereafter, adhesive strength (N/25 mm) of each of the cut pieces was measured when it was peeled off from the glass plate at a peeling angle of 180° and at each of different peeling rates (300 mm/minute, 1 m/minute, and 30 m/minute). A high-speed peeling tester (High-Low Temperature Peel Strength Tester manufactured by KOUKEN CO., LTD.) was used at a peeling rate of 20 m/minute or less, and another high-speed peeling tester (TE-702 manufactured by TESTER SANGYO CO., LTD.) was used at a peeling rate of more than 20 m/minute. The adhesive strength was evaluated using five measurements. After the cut piece was peeled off, the level of adhesive residue on the non-alkali glass surface was visually rated on a scale of 1 to 5 as shown below. The results are shown in Table 4.

5: No adhesive residue is left on the glass surface.
4: A very thin trace of adhesive residue is left on part of the glass surface.
3: A very thin trace of adhesive residue is left over the glass surface.
2: Thin adhesive residues are left over the glass surface.
1: The pressure-sensitive adhesive layer is left over the glass surface, and cohesive failure occurs in the pressure-sensitive adhesive layer.

TABLE 1

| | (Meth)acryl-based copolymer (A) | | | | High-Tg component (B) | |
|---|---|---|---|---|---|---|
| | Monomer emulsion type | Compositon | Weight ratio (%) | Tg (° C.) | Type | Compositon |
| Example 1 | (2a) | BA/AA/KBM503 | 94.95/5/0.05 | −40 | Monomer emulsion (1a) | MMA/BA/AA |
| Example 2 | (2b) | BA/AA/KBM503 | 94.99/5/0.01 | −40 | Monomer emulsion (1a) | MMA/BA/AA |
| Example 3 | (2c) | MMA/BA/AA/KBM503 | 30/67.97/2/0.03 | −12 | Monomer emulsion (1a) | MMA/BA/AA |
| Example 4 | (2d) | MMA/BA/AA/KBM503 | 20/77.97/2/0.03 | −23 | Monomer emulsion (1a) | MMA/BA/AA |
| Example 5 | (2e) | MMA/BA/AA/KBM503 | 10/87.97/2/0.03 | −34 | Monomer emulsion (1a) | MMA/BA/AA |
| Example 6 | (2c) | MMA/BA/AA/KBM503 | 30/67.97/2/0.03 | −12 | Monomer emulsion (1b) | MMA/BA/AA |
| Example 7 | (2d) | MMA/BA/AA/KBM503 | 20/77.97/2/0.03 | −23 | Monomer emulsion (1b) | MMA/BA/AA |
| Example 8 | (2e) | MMA/BA/AA/KBM503 | 10/87.97/2/0.03 | −34 | Monomer emulsion (1b) | MMA/BA/AA |
| Example 9 | (2c) | MMA/BA/AA/KBM503 | 30/67.97/2/0.03 | −12 | Monomer emulsion (1c) | MMA/BA/AA |
| Example 10 | (2d) | MMA/BA/AA/KBM503 | 20/77.97/2/0.03 | −23 | Monomer emulsion (1c) | MMA/BA/AA |

TABLE 1-continued

| | | | | | | |
|---|---|---|---|---|---|---|
| Example 11 | (2e) | MMA/BA/AA/KBM503 | 10/87.97/2/0.03 | −34 | Mononmer emulsion (1c) | MMA/BA/AA |
| Example 12 | (3) | BA/AA | 95/5 | −40 | Mononmer emulsion (1a) | MMA/BA/AA |
| Example 13 | (3) | BA/AA | 95/5 | −40 | Mononmer emulsion (1a) | MMA/BA/AA |
| Example 14 | (3) | BA/AA | 95/5 | −40 | Mononmer emulsion (1a) | MMA/BA/AA |
| Example 15 | (3) | BA/AA | 95/5 | −40 | Mononmer emulsion (1a) | MMA/BA/AA |
| Example 16 | (3) | BA/AA | 95/5 | −40 | Water-soluble resin | MMA/AA |
| Example 17 | (3) | BA/AA | 95/5 | −40 | Water-soluble resin | MMA/AA |
| Example 18 | (3) | BA/AA | 95/5 | −40 | Water-soluble resin | MMA/AA |
| Example 19 | (3) | BA/AA | 95/5 | −40 | Water-soluble resin | MMA/AA |
| Example 20 | (2a) | BA/AA/KBM503 | 94.95/5/0.05 | −40 | Inorganic material | Colloidal silica *1 |
| Example 21 | (2a) | BA/AA/KBM503 | 94.95/5/0.05 | −40 | Inorganic material | Colloidal silica *1 |
| Example 22 | (2a) | BA/AA/KBM503 | 94.95/5/0.05 | −40 | Inorganic material | Colloidal silica *1 |
| Example 23 | (2a) | BA/AA/KBM503 | 94.95/5/0.05 | −40 | Inorganic material | Colloidal silica *1 |
| Example 24 | (2a) | BA/AA/KBM503 | 94.95/5/0.05 | −40 | Inorganic material | Colloidal silica *2 |
| Example 25 | (2a) | BA/AA/KBM503 | 94.95/5/0.05 | −40 | Inorganic material | Colloidal silica *2 |
| Example 26 | (2a) | BA/AA/KBM503 | 94.95/5/0.05 | −40 | Inorganic material | Colloidal silica *2 |
| Example 27 | (2a) | BA/AA/KBM503 | 94.95/5/0.05 | −40 | Inorganic material | Colloidal silica *2 |
| Example 28 | (2a) | BA/AA/KBM503 | 94.95/5/0.05 | −40 | Inorganic material | Water glass *3 |
| Example 29 | (2a) | BA/AA/KBM503 | 94.95/5/0.05 | −40 | Inorganic material | Water glass *3 |
| Example 30 | (2a) | BA/AA/KBM503 | 94.95/5/0.05 | −40 | Inorganic material | Water glass *3 |
| Comparative Example 1 | (3) | BA/AA | 95/5 | −30 | Clay mineral | SPN* 4 |
| Comparative Example 2 | (3) | BA/AA | 95/5 | −40 | — | — |
| Comparative Example 3 | (3) | BA/AA | 95/5 | −30 | Mononmer emulsion (1d) | MMA/BA/AA |
| Comparative Example 4 | (3) | BA/AA | 95/5 | −40 | Mononmer emulsion (1e) | MMA/BA/AA |
| Comparative Example 5 | (3) | BA/AA | 95/5 | −30 | Inorganic material | Glass beads *5 |

| | High-Tg component (B) | | Tg difference (° C.) between (methy)acryl-based copolymer (A) and component (B) | (Meth)acryl-based copolmer (A)/component (B) weight ratio | Pressure-sensitive adhesive layer type |
|---|---|---|---|---|---|
| | Weight ratio (%) | Tg (° C.) | | | |
| Example 1 | 90/8/2 | 86 | 126 | 80/20 | Core/shell stucture |
| Example 2 | 90/8/2 | 86 | 126 | 80/20 | Core/shell stucture |
| Example 3 | 90/8/2 | 86 | 98 | 80/20 | Core/shell stucture |
| Example 4 | 90/8/2 | 86 | 108 | 80/20 | Core/shell stucture |
| Example 5 | 90/8/2 | 86 | 120 | 80/20 | Core/shell stucture |
| Example 6 | 75/23/2 | 55 | 67 | 65/35 | Core/shell stucture |
| Example 7 | 75/23/2 | 55 | 78 | 75/25 | Core/shell stucture |
| Example 8 | 75/23/2 | 55 | 89 | 85/15 | Core/shell stucture |
| Example 9 | 80/18/2 | 65 | 77 | 65/35 | Core/shell stucture |
| Example 10 | 80/18/2 | 65 | 86 | 75/25 | Core/shell stucture |
| Example 11 | 80/18/2 | 65 | 99 | 85/15 | Core/shell stucture |
| Example 12 | 90/8/2 | 86 | 126 | 80/20 | Core/shell stucture |
| Example 13 | 90/8/2 | 85 | 126 | 90/10 | Blend emulsion |
| Example 14 | 90/8/2 | 86 | 126 | 80/20 | Blend emulsion |
| Example 15 | 90/8/2 | 85 | 126 | 70/30 | Blend emulsion |
| Example 16 | 10/90 | 106 | 146 | 95/5 | Water-soluble resin blend |
| Example 17 | 10/90 | 106 | 146 | 90/10 | Water-soluble resin blend |
| Example 18 | 10/90 | 106 | 146 | 80/20 | Water-soluble resin blend |
| Example 19 | 10/90 | 106 | 146 | 70/30 | Water-soluble resin blend |
| Example 20 | — | 300 or more | 340 or more | 95/5 | Colloidal silica blend |
| Example 21 | — | 300 or more | 340 or more | 90/10 | Colloidal silica blend |
| Example 22 | — | 300 or more 340 or more | 340 or more | 80/20 | Colloidal silica blend |
| Example 23 | — | 300 or more | 340 or more | 75/25 | Colloidal silica blend |
| Example 24 | — | 300 or more | 340 or more | 95/5 | Colloidal silica blend |
| Example 25 | — | 300 or more | 340 or more | 90/10 | Colloidal silica blend |
| Example 26 | — | 300 or more | 340 or more | 80/20 | Colloidal silica blend |

TABLE 1-continued

| | | | | | |
|---|---|---|---|---|---|
| Example 27 | — | 300 or more | 340 or more | 75/25 | Colloidal silica blend |
| Example 28 | — | 300 or more | 340 or more | 90/10 | Water glass blend |
| Example 29 | — | 300 or more | 340 or more | 80/20 | Water glass blend |
| Example 30 | — | 300 or more | 340 or more | 75/25 | Water glass blend |
| Comparative Example 1 | — | 300 or more | 250 | 90/10 | Clay mineral blend |
| Comparative Example 2 | — | — | — | — | Area of high-Tg component |
| Comparative Example 3 | 20/88/2 | −34 | 6 | 90/10 | Low-Tg emulsion blend |
| Comparative Example 4 | 40/58/2 | 1 | 41 | 90/10 | Middle-Tg emulsion blend |
| Comparative Example 5 | — | 300 or more | 340 or more | 95/5 | Glass beads blend |

Note:
KBM503, which is crosslinking agent, is neglected in the calculation of the glass transition temperatures.

TABLE 2

| | Maximum length (nm) of component (B) domain | Moisture resistance | Haze value (H20) | Haze value (H200) | Haze (%) Ratio (H200/H20) |
|---|---|---|---|---|---|
| Example 1 | 50 | 5 | 0.4 | 0.5 | 1.25 |
| Example 2 | 50 | 5 | 0.4 | 0.5 | 1.25 |
| Example 3 | 50 | 4 | 0.4 | 0.5 | 1.25 |
| Example 4 | 50 | 5 | 0.4 | 0.5 | 1.25 |
| Example 5 | 50 | 5 | 0.4 | 0.5 | 1.25 |
| Example 6 | 100 | 5 | 0.6 | 0.8 | 1.33 |
| Example 7 | 70 | 4 | 0.5 | 0.7 | 1.40 |
| Example 8 | 50 | 4 | 0.4 | 0.5 | 1.25 |
| Example 9 | 100 | 5 | 0.6 | 0.8 | 1.33 |
| Example 10 | 70 | 4 | 0.5 | 0.7 | 1.40 |
| Example 11 | 50 | 4 | 0.4 | 0.5 | 1.25 |
| Example 12 | 50 | 4 | 0.4 | 0.5 | 1.25 |
| Example 13 | 100 | 5 | 0.5 | 0.6 | 1.20 |
| Example 14 | 100 | 5 | 0.6 | 0.8 | 1.33 |
| Example 15 | 100 | 5 | 0.6 | 1 | 1.67 |
| Example 16 | 80 | 5 | 0.6 | 0.7 | 1.17 |
| Example 17 | 100 | 5 | 0.6 | 1 | 1.67 |
| Example 18 | 120 | 5 | 0.7 | 1.4 | 2.00 |
| Example 19 | 185 | 5 | 0.7 | 1.5 | 2.14 |
| Example 20 | 20 | 4 | 0.5 | 0.8 | 1.60 |
| Example 21 | 20 | 5 | 0.6 | 1 | 1.67 |
| Example 22 | 20 | 4 | 0.7 | 1.2 | 1.71 |
| Example 23 | 20 | 4 | 0.9 | 1.4 | 1.56 |
| Example 24 | 6 | 4 | 0.4 | 0.9 | 2.25 |
| Example 25 | 6 | 5 | 0.5 | 1 | 2.00 |
| Example 26 | 6 | 4 | 0.5 | 1.1 | 2.20 |
| Example 27 | 6 | 4 | 0.6 | 1.2 | 2.00 |
| Example 28 | 90 | 4 | 0.4 | 0.8 | 2.00 |
| Example 29 | 130 | 4 | 0.5 | 1 | 2.00 |
| Example 30 | 170 | 4 | 0.7 | 1.4 | 2.00 |
| Comparative Example 1 | 250 | 3 | 1.2 | 2.6 | 2.17 |
| Comparative Example 2 | — | 2 | 0.4 | 0.5 | 1.25 |
| Comparative Example 3 | — | 2 | 0.4 | 0.5 | 1.25 |
| Comparative Example 4 | 100 | 2 | 0.5 | 0.7 | 1.40 |
| Comparative Example 5 | 30000 | 1 | 10.5 | 45.1 | 4.30 |

TABLE 3

| | Reworkability | | | | | | | | | | | |
|---|---|---|---|---|---|---|---|---|---|---|---|---|
| | Peeling rate: 300 mm/min | | | | | | | | Peeling rate: 1 m/min | | | |
| | Adhesive strength (N/25 mm) | | | | | Average adhesive strength (N/25 mm) | Adhesive residue | Adhesive strength (N/25 mm) | | | | |
| Example 1 | 8.0 | 8.0 | 8.2 | 7.8 | 8.5 | 8.1 | 5 | 5.3 | 6.2 | 5.8 | 6.0 | 6.2 |
| Example 2 | 13.6 | 13.4 | 13.0 | 14.0 | 13.7 | 13.5 | 4 | 9.2 | 8.9 | 9.4 | 9.0 | 9.3 |
| Example 3 | 14.2 | 14.0 | 14.5 | 12.8 | 14.8 | 14.2 | 4 | 11.0 | 10.7 | 11.4 | 11.1 | 10.9 |
| Example 4 | 13.3 | 13.5 | 13.8 | 13.0 | 12.9 | 13.1 | 4 | 11.2 | 11.5 | 11.0 | 10.5 | 10.5 |
| Example 5 | 11.7 | 11.2 | 11.3 | 11.0 | 11.6 | 11.4 | 5 | 9.0 | 9.2 | 9.5 | 9.1 | 9.2 |
| Example 6 | 6.5 | 6.3 | 6.3 | 6.5 | 6.1 | 5.3 | 5 | 6.0 | 5.9 | 6.0 | 5.8 | 5.6 |
| Example 7 | 7.8 | 7.4 | 7.4 | 7.6 | 7.5 | 7.5 | 5 | 6.9 | 6.6 | 6.8 | 7.0 | 6.5 |
| Example 8 | 13.6 | 13.3 | 12.9 | 12.7 | 13.6 | 13.1 | 4 | 12.3 | 12.4 | 12.0 | 11.8 | 11.6 |
| Example 9 | 5.8 | 5.6 | 6.0 | 6.1 | 5.8 | 5.9 | 5 | 5.2 | 5.0 | 5.4 | 5.2 | 5.3 |
| Example 10 | 7.2 | 7.0 | 6.8 | 7.2 | 7.0 | 7.0 | 5 | 6.5 | 6.2 | 6.4 | 6.5 | 6.1 |
| Example 11 | 11.5 | 11.4 | 11.7 | 12.3 | 11.4 | 11.5 | 4 | 10.9 | 11.0 | 10.7 | 11.2 | 10.5 |
| Example 12 | 14.5 | 14.5 | 14.2 | 13.6 | 13.6 | 14.1 | 4 | 10.8 | 11.2 | 11.4 | 10.6 | 10.7 |
| Example 13 | 10.2 | 9.9 | 10.3 | 10.1 | 10.5 | 10.2 | 5 | 7.9 | 7.2 | 5.9 | 6.5 | 7.2 |
| Example 14 | 7.4 | 6.2 | 6.0 | 6.7 | 7.6 | 6.7 | 5 | 5.5 | 5.1 | 5.9 | 5.3 | 5.7 |
| Example 15 | 4.5 | 4.8 | 4.8 | 4.9 | 5.0 | 4.8 | 5 | 4.0 | 4.2 | 3.5 | 3.8 | 1.0 |
| Example 16 | 6.2 | 6.4 | 6.2 | 7.1 | 6.8 | 6.5 | 5 | 5.3 | 4.5 | 4.9 | 4.4 | 5.0 |

TABLE 3-continued

| | | | | | | | | | | | |
|---|---|---|---|---|---|---|---|---|---|---|---|
| Example 17 | 6 | 5.8 | 6 | 5.7 | 5.5 | 5.8 | 5 | 4.2 | 4.3 | 4.0 | 3.9 | 4.0 |
| Example 18 | 4.5 | 4.9 | 4.5 | 4.6 | 3.6 | 4.7 | 5 | 3.6 | 3.8 | 3.3 | 3.8 | 3.4 |
| Example 19 | 3.4 | 3.1 | 3.2 | 3 | 3.6 | 3.3 | 5 | 2.9 | 2.9 | 2.7 | 2.6 | 3.5 |
| Example 20 | 4.9 | 4.3 | 5.3 | 4.5 | 4.7 | 4.7 | 5 | 3.7 | 4.4 | 3.4 | 4.1 | 3.8 |
| Example 21 | 4.1 | 4 | 4.2 | 3.8 | 3.7 | 4.0 | 5 | 3.5 | 3.5 | 3.7 | 3.4 | 3.9 |
| Example 22 | 3.4 | 3.5 | 3.2 | 3.3 | 3.4 | 3.4 | 5 | 3.2 | 3.6 | 2.9 | 2.8 | 2.5 |
| Example 23 | 2.5 | 2.8 | 3 | 2.9 | 2.8 | 2.8 | 5 | 2.5 | 2.2 | 2.3 | 2.1 | 2.0 |
| Example 24 | 4.3 | 4.5 | 5.1 | 4.2 | 4.5 | 4.5 | 5 | 3.8 | 4.2 | 3.7 | 3.5 | 4.0 |
| Example 25 | 3.8 | 3.7 | 4 | 3.6 | 3.7 | 3.8 | 5 | 3.3 | 3.4 | 3.5 | 3.1 | 3.2 |
| Example 26 | 3.2 | 3.4 | 3.5 | 3.1 | 3.2 | 3.3 | 5 | 3.9 | 2.7 | 2.8 | 2.4 | 2.1 |
| Example 27 | 2.4 | 2.7 | 3.1 | 3.8 | 2.6 | 2.7 | 5 | 2.0 | 2.2 | 2.5 | 2.6 | 2.3 |
| Example 28 | 3.7 | 4.0 | 3.8 | 4.1 | 4.0 | 3.9 | 5 | 3.5 | 3.5 | 4.1 | 3.9 | 3.7 |
| Example 29 | 3.3 | 3.2 | 3.5 | 3.7 | 3.4 | 3.4 | 5 | 2.6 | 2.5 | 2.8 | 2.5 | 2.7 |
| Example 30 | 2.8 | 2.6 | 2.5 | 2.5 | 3.0 | 2.7 | 5 | 2.1 | 2.2 | 2.4 | 2.0 | 2.9 |
| Comparative Example 1 | 1.7 | 2.4 | 1.9 | 2.0 | 2.2 | 2.0 | 5 | 1.6 | 1.8 | 2.0 | 2.5 | 1.4 |
| Comparative Example 2 | 7.8 | 7.1 | 8.3 | 7.5 | 7.5 | 7.5 | 5 | 10.0 | 9.5 | 10.3 | 9.8 | 9.7 |
| Comparative Example 3 | 7.3 | 7.6 | 7.9 | 7.5 | 7.2 | 7.5 | 5 | 9.8 | 9.4 | 10 | 9.2 | 9.6 |
| Comparative Example 4 | 7.9 | 8.1 | 7.2 | 7.5 | 7.2 | 7.5 | 5 | 9.5 | 9.2 | 9.8 | 9.2 | 9.8 |
| Comparative Example 5 | 5 | 4.8 | 5.2 | 4.6 | 4.5 | 4.9 | 5 | 4.9 | 4.2 | 4.3 | 4.3 | 4.8 |

| | Reworkability | | | | | | | | |
|---|---|---|---|---|---|---|---|---|---|
| | Peeling rate: 1 m/min | | Peeling rate: 30 m/min | | | | | | |
| | Average adhesive strength (N/25 mm) | Adhesive residue | Adhesive strength (N/25 mm) | | | | | Average adhesive strength (N/25 mm) | Adhesive residue |
| Example 1 | 5.9 | 5 | 4.8 | 4.4 | 4.6 | 5.4 | 4.3 | 4.5 | 5 |
| Example 2 | 9.2 | 5 | 6.3 | 6.5 | 6.0 | 6.1 | 6.2 | 6.2 | 5 |
| Example 3 | 11.0 | 4 | 9.8 | 9.5 | 9.2 | 9.8 | 10.1 | 9.7 | 5 |
| Example 4 | 11.0 | 4 | 8.6 | 8.8 | 8.9 | 9.8 | 8.8 | 8.7 | 5 |
| Example 5 | 9.2 | 5 | 6.4 | 6.8 | 6.1 | 7.0 | 6.7 | 6.6 | 5 |
| Example 6 | 5.9 | 5 | 5.1 | 5.0 | 4.7 | 5.1 | 5.3 | 5.0 | 5 |
| Example 7 | 6.8 | 5 | 6.0 | 6.2 | 5.7 | 5.8 | 6.3 | 6.0 | 5 |
| Example 8 | 12.0 | 4 | 10.9 | 10.4 | 10.5 | 10.6 | 11.0 | 10.7 | 4 |
| Example 9 | 5.2 | 4 | 4.9 | 4.5 | 4.3 | 4.5 | 4.4 | 4.5 | 5 |
| Example 10 | 6.1 | 5 | 5.5 | 5.1 | 5.3 | 5.3 | 5.6 | 5.4 | 5 |
| Example 11 | 10.9 | 4 | 10.0 | 8.7 | 9.9 | 9.7 | 10.2 | 9.9 | 4 |
| Example 12 | 10.9 | 4 | 9.1 | 9.2 | 9.4 | 9.5 | 9.3 | 9.3 | 4 |
| Example 13 | 7.0 | 5 | 5.5 | 5.3 | 5.8 | 5.4 | 5.5 | 5.5 | 5 |
| Example 14 | 5.5 | 5 | 4.5 | 4.0 | 4.3 | 3.8 | 4.2 | 4.2 | 5 |
| Example 15 | 3.9 | 5 | 3.5 | 3.2 | 3.3 | 3.1 | 3.0 | 3.2 | 5 |
| Example 16 | 4.8 | 5 | 3.7 | 3.5 | 3.4 | 3.6 | 3.6 | 3.6 | 5 |
| Example 17 | 4.1 | 5 | 3.4 | 3.1 | 3.0 | 2.9 | 3.3 | 3.2 | 5 |
| Example 18 | 3.4 | 5 | 2.8 | 2.8 | 2.7 | 2.4 | 2.7 | 2.6 | 5 |
| Example 19 | 2.7 | 5 | 2.0 | 2.3 | 1.9 | 3.2 | 2.4 | 2.1 | 5 |
| Example 20 | 4.8 | 5 | 3.5 | 3.4 | 3.6 | 3.5 | 3.4 | 3.5 | 5 |
| Example 21 | 3.5 | 5 | 3.0 | 3.2 | 2.8 | 2.7 | 2.5 | 2.9 | 5 |
| Example 22 | 2.3 | 5 | 2.4 | 2.2 | 2.3 | 2.5 | 2.4 | 2.3 | 5 |
| Example 23 | 2.3 | 5 | 2.8 | 2.0 | 1.8 | 1.7 | 1.5 | 1.8 | 5 |
| Example 24 | 3.9 | 5 | 3.3 | 3.1 | 3.4 | 3.2 | 3.3 | 3.3 | 5 |
| Example 25 | 3.3 | 5 | 3.0 | 2.8 | 2.6 | 2.8 | 2.7 | 2.8 | 5 |
| Example 26 | 2.6 | 5 | 2.5 | 2.8 | 2.8 | 3.4 | 2.2 | 2.5 | 5 |
| Example 27 | 2.3 | 5 | 1.6 | 1.7 | 1.8 | 1.4 | 1.7 | 1.6 | 5 |
| Example 28 | 3.8 | 5 | 3.4 | 3.4 | 2.5 | 3.4 | 3.6 | 3.5 | 5 |
| Example 29 | 2.6 | 5 | 2.0 | 2.2 | 2.4 | 2.1 | 2.0 | 2.2 | 5 |
| Example 30 | 2.1 | 5 | 1.7 | 1.5 | 1.7 | 1.8 | 1.5 | 1.5 | 5 |
| Comparative Example 1 | 1.7 | 5 | 1.3 | 0.9 | 1.1 | 1.0 | 1.1 | 1.1 | 5 |
| Comparative Example 2 | 9.9 | 4 | 19.5 | 20.3 | 19.3 | 18.8 | 19.3 | 19.4 | 2 |
| Comparative Example 3 | 9.6 | 4 | 16.7 | 16.3 | 15.2 | 16.2 | 16.3 | 16.2 | 2 |
| Comparative Example 4 | 9.4 | 4 | 15.3 | 16.6 | 16.5 | 16.4 | 16.2 | 15.9 | 2 |
| Comparative Example 5 | 4.2 | 5 | 4.1 | 4.1 | 3.4 | 3.7 | 3.6 | 3.8 | 5 |

TABLE 4

| | Recyclability | | | | | | | | | | | |
|---|---|---|---|---|---|---|---|---|---|---|---|---|
| | Peeling rate: 300 mm/min | | | | | | | Peeling rate: 1 m/min | | | | |
| | Adhesive strength (N/25 mm) | | | | | Average adhesive strength (N/25 mm) | Adhesive residue | Adhesive strength (N/25 mm) | | | | |
| Example 1 | 17.4 | 17.6 | 17.9 | 17.2 | 17.5 | 17.5 | 5 | 14.6 | 14.5 | 15.1 | 14.8 | 14.6 |
| Example 2 | 25.2 | 24.1 | 25.5 | 23.9 | 24.9 | 24.7 | 3 | 19.8 | 20.3 | 18.9 | 19.4 | 19.4 |
| Example 3 | 24.4 | 25.4 | 25.1 | 25.4 | 24.8 | 25.0 | 3 | 21.1 | 20.7 | 22.2 | 21.6 | 20.1 |
| Example 4 | 19.2 | 18.3 | 18.8 | 19.4 | 18.9 | 19.1 | 4 | 15.5 | 15.4 | 15.8 | 16.0 | 15.5 |
| Example 5 | 17.2 | 17.7 | 17.7 | 17.5 | 17.6 | 17.4 | 5 | 14.2 | 14.4 | 14.5 | 14.1 | 14.0 |
| Example 6 | 13.0 | 14.9 | 15.3 | 14.6 | 14.4 | 14.8 | 5 | 12.2 | 11.8 | 12.4 | 12.2 | 11.9 |
| Example 7 | 15.2 | 16.0 | 16.5 | 15.2 | 16.8 | 16.3 | 3 | 13.4 | 13.2 | 13.0 | 13.5 | 13.2 |
| Example 8 | 25.1 | 24.5 | 24.9 | 25.2 | 26.5 | 25.1 | 5 | 18.7 | 19.0 | 18.9 | 19.2 | 18.6 |
| Example 9 | 14.3 | 14.5 | 14.7 | 14.9 | 14.4 | 14.6 | 5 | 12.1 | 12.0 | 11.7 | 12.4 | 12.3 |
| Example 10 | 15.7 | 15.4 | 15.2 | 15.8 | 15.3 | 15.5 | 5 | 12.5 | 12.4 | 12.6 | 12.4 | 12.5 |
| Example 11 | 17.9 | 17.4 | 17.3 | 17.8 | 17.1 | 17.5 | 5 | 14.4 | 14.8 | 14.5 | 13.7 | 14.0 |
| Example 12 | 36.4 | 26.1 | 25.8 | 25.9 | 25.5 | 25.9 | 5 | 21.1 | 21.5 | 20.9 | 20.7 | 21.1 |
| Example 13 | 17.2 | 17.5 | 16.8 | 16.3 | 17.0 | 17.0 | 5 | 15.0 | 14.6 | 15.2 | 14.9 | 14.6 |
| Example 14 | 15.7 | 16.3 | 15.8 | 16.1 | 15.6 | 15.9 | 5 | 14.2 | 13.7 | 14.1 | 13.8 | 14.0 |
| Example 15 | 13.4 | 13.1 | 13.0 | 13.7 | 13.5 | 13.3 | 5 | 10.8 | 10.4 | 10.7 | 11.0 | 10.5 |
| Example 16 | 14.5 | 13.2 | 14.1 | 13.6 | 13.5 | 10.8 | 5 | 12.8 | 12.4 | 12.1 | 12.7 | 12.2 |
| Example 17 | 13 | 12.7 | 13.2 | 13.2 | 13.5 | 13.1 | 5 | 10.2 | 10.8 | 10.2 | 10.5 | 10.4 |
| Example 18 | 11.8 | 11.5 | 11.6 | 11 | 11.1 | 11.4 | 5 | 9.6 | 9.6 | 9.9 | 9.5 | 9.8 |
| Example 19 | 10.1 | 9.8 | 9.6 | 10.5 | 10 | 10.0 | 5 | 7.5 | 7.8 | 7.6 | 7.7 | 7.9 |
| Example 20 | 10.6 | 11.0 | 10.2 | 10.4 | 10.7 | 10.7 | 5 | 10.0 | 10.2 | 9.6 | 9.8 | 9.7 |
| Example 21 | 9.1 | 9.5 | 9.1 | 8.7 | 8.8 | 9.0 | 5 | 7.6 | 7.4 | 7.5 | 7.7 | 7.4 |
| Example 22 | 7.8 | 7.5 | 7.4 | 7.5 | 7.8 | 7.6 | 5 | 6.3 | 6.0 | 6.0 | 6.3 | 6.5 |
| Example 23 | 6.5 | 6.4 | 6 | 6.2 | 6.4 | 6.3 | 5 | 5.4 | 5.4 | 5.2 | 5.0 | 5.5 |
| Example 24 | 10.5 | 10.8 | 10.5 | 10.4 | 10.0 | 10.4 | 5 | 9.2 | 9.6 | 9.4 | 9.4 | 9.0 |
| Example 25 | 8.5 | 8.3 | 8. | 8.1 | 8.7 | 8.4 | 5 | 6.5 | 6.4 | 5.6 | 6.5 | 6.3 |
| Example 26 | 7.1 | 6.7 | 6.9 | 7.3 | 7.0 | 7.0 | 5 | 5.3 | 5.4 | 5.6 | 5.5 | 5.4 |
| Example 27 | 5.5 | 5.2 | 5.5 | 5.5 | 5.1 | 5.4 | 5 | 4.1 | 4.0 | 4.4 | 4.2 | 4.0 |
| Example 28 | 11.0 | 10.3 | 10.7 | 10.4 | 11.0 | 10.7 | 5 | 10.2 | 10.0 | 10.3 | 9.9 | 10.1 |
| Example 29 | 8.9 | 8.5 | 8.9 | 8.5 | 8.2 | 8.6 | 5 | 7.2 | 7.4 | 7.1 | 7.0 | 7.7 |
| Example 30 | 7.6 | 7.3 | 7.5 | 7.7 | 7.6 | 7.5 | 5 | 5.5 | 5.5 | 5.0 | 5.1 | 5.2 |
| Comparative Example 1 | 8.9 | 8.4 | 9.3 | 9.0 | 9.4 | 9.0 | 5 | 9.7 | 8.6 | 8.9 | 8.6 | 8.5 |
| Comparative Example 2 | 21.5 | 22.8 | 22.1 | 23.4 | 22.6 | 22.5 | 1 | 25.9 | 24.8 | 26.3 | 26.0 | 25.8 |
| Comparative Example 3 | 20.9 | 20.6 | 23.3 | 21.5 | 20.7 | 21.0 | 1 | 25.8 | 25.4 | 25.4 | 25.8 | 25.3 |
| Comparative Example 4 | 19.9 | 20.1 | 20.4 | 19.6 | 19.8 | 20.0 | 1 | 21.4 | 22.4 | 22.6 | 21.9 | 23.2 |
| Comparative Example 5 | 10.6 | 11.0 | 10.7 | 10.4 | 19.7 | 10.7 | 5 | 10.0 | 10.2 | 9.6 | 9.8 | 9.7 |

| | Recyclability | | | | | | | | |
|---|---|---|---|---|---|---|---|---|---|
| | Peeling rate: 1 m/min | | Peeling rate: 30 m/min | | | | | | |
| | Average adhesive strength (N/25 mm) | Adhesive residue | Adhesive strength (N/25 mm) | | | | | Average adhesive strength (N/25 mm) | Adhesive residue |
| Example 1 | 14.7 | 5 | 10.0 | 8.7 | 9.5 | 9.4 | 9.8 | 9.7 | 5 |
| Example 2 | 19.6 | 4 | 11.3 | 10.5 | 11.4 | 10.9 | 10.7 | 11.0 | 5 |
| Example 3 | 21.1 | 3 | 18.4 | 17.6 | 18.5 | 17.9 | 18.0 | 18.1 | 4 |
| Example 4 | 15.6 | 5 | 11.1 | 10.2 | 10.6 | 10.7 | 10.5 | 10.6 | 5 |
| Example 5 | 14.2 | 5 | 10.2 | 9.8 | 9.9 | 10.1 | 10.0 | 10.0 | 5 |
| Example 6 | 12.1 | 4 | 8.8 | 8.6 | 8.7 | 8.6 | 8.5 | 8.6 | 5 |
| Example 7 | 13.3 | 5 | 9.2 | 9.0 | 9.5 | 9.6 | 9.1 | 9.3 | 5 |
| Example 8 | 18.9 | 4 | 11.2 | 11.6 | 11.0 | 11.5 | 11.0 | 11.3 | 5 |
| Example 9 | 12.1 | 5 | 8.5 | 8.5 | 8.1 | 8.8 | 8.4 | 8.5 | 5 |
| Example 10 | 12.5 | 5 | 7.9 | 8.0 | 8.2 | 8.1 | 7.6 | 8.0 | 5 |
| Example 11 | 14.1 | 5 | 10.1 | 9.5 | 10.4 | 10.1 | 9.8 | 10.0 | 5 |
| Example 12 | 21.1 | 3 | 16.5 | 17.0 | 16.4 | 16.0 | 16.2 | 16.4 | 4 |
| Example 13 | 14.9 | 5 | 10.4 | 10.1 | 9.9 | 9.7 | 9.8 | 10.0 | 5 |
| Example 14 | 14.0 | 5 | 9.4 | 9.2 | 9.6 | 9.3 | 9.4 | 9.4 | 5 |
| Example 15 | 10.7 | 5 | 6.8 | 6.5 | 6.5 | 6.4 | 6.8 | 6.6 | 5 |
| Example 16 | 12.4 | 5 | 11.2 | 10.8 | 11.4 | 10.5 | 10.4 | 10.9 | 5 |
| Example 17 | 10.3 | 5 | 6.5 | 6.1 | 6.4 | 8.8 | 6.2 | 6.4 | 5 |
| Example 18 | 9.7 | 5 | 6.0 | 6.2 | 5.6 | 5.7 | 5.5 | 5.8 | 5 |
| Example 19 | 7.7 | 5 | 5.3 | 5.0 | 5.1 | 4.7 | 4.8 | 5.0 | 5 |
| Example 20 | 9.9 | 5 | 9.6 | 9.8 | 9.5 | 9.4 | 9.3 | 9.5 | 5 |
| Example 21 | 7.5 | 5 | 5.1 | 5.4 | 5.5 | 4.9 | 4.8 | 5.1 | 5 |

TABLE 4-continued

| | | | | | | | | | |
|---|---|---|---|---|---|---|---|---|---|
| Example 22 | 6.2 | 5 | 4.5 | 4.8 | 4.9 | 4.6 | 4.5 | 4.7 | 5 |
| Example 23 | 5.3 | 5 | 3.5 | 3.0 | 3.1 | 3.8 | 3.4 | 3.4 | 5 |
| Example 24 | 9.3 | 5 | 6.9 | 9.5 | 9.1 | 8.7 | 8.9 | 9.0 | 5 |
| Example 25 | 8.5 | 5 | 3.8 | 3.6 | 3.5 | 3.5 | 3.9 | 3.6 | 5 |
| Example 26 | 6.3 | 5 | 3.0 | 2.8 | 3.3 | 2.9 | 3.0 | 3.0 | 5 |
| Example 27 | 4.1 | 5 | 2.6 | 2.4 | 2.7 | 2.5 | 2.8 | 2.6 | 5 |
| Example 28 | 10.1 | 5 | 10.1 | 10.0 | 10.3 | 10.1 | 9.9 | 10.1 | 5 |
| Example 29 | 7.3 | 5 | 5.5 | 5.3 | 5.5 | 5.1 | 6.3 | 5.4 | 5 |
| Example 30 | 5.3 | 5 | 3.4 | 3.0 | 3.1 | 3.3 | 3.7 | 3.3 | 5 |
| Comparative Example 1 | 8.7 | 5 | 6.9 | 8.3 | 8.1 | 8.0 | 8.2 | 8.3 | 5 |
| Comparative Example 2 | 25.8 | 1 | 33.7 | 32.7 | 33.4 | 33.8 | 34.5 | 33.6 | 1 |
| Comparative Example 3 | 25.6 | 1 | 30.4 | 31.5 | 31.8 | 32.7 | 32.5 | 31.8 | 1 |
| Comparative Example 4 | 22.3 | 1 | 25.3 | 26.1 | 25.8 | 26.4 | 25.8 | 25.9 | 1 |
| Comparative Example 5 | 9.9 | 5 | 9.6 | 3.8 | 9.5 | 9.4 | 9.3 | 9.5 | 5 |

Tables 1 to 4 show that the pressure-sensitive adhesive layer-attached optical film (pressure-sensitive adhesive layer-attached polarizing plate) of each example according to the present invention has high transparency, high moisture resistance, and good reworkability and recyclability. In contrast, Comparative Example 1, in which the maximum length of the component (B) domains exceeds 200 nm, has a high haze value, which means an insufficient level of optical properties. Comparative Example 2, in which the component (B) is not used, has an insufficient level of reworkability or recyclability. The pressure-sensitive adhesive layer of Comparative Example 2 was not able to be measured for adhesive strength to glass because it underwent cohesive failure. Thus, the value indicates the cohesive failure strength of the pressure-sensitive adhesive layer. Thus, the adhesive residue is at a poor level even though the adhesive strength is not so high.

In the table, BA represents butyl acrylate (228.15 K), AA: acrylic acid (379.15 K), KBM503: 3-methacryloyloxypropyl-trimethoxysilane (KBM-503, manufactured by Shin-Etsu Chemical Co., Ltd.), and MMA: methyl methacrylate (278.15 K). Each parenthesized temperature is the glass transition temperature (K) of a homopolymer of each monomer, which is used in the calculation of the glass transition temperatures.

In the table, *1 represents colloidal silica (SNOWTEX 20 (trade name) manufactured by Nissan Chemical Industries, Ltd.), *2: colloidal silica (SNOWTEX XS (trade name) manufactured by Nissan Chemical Industries, Ltd.), *3: water glass (water glass No. 3 manufactured by Fuji Kagaku CORP., sodium silicate, 38% in solid concentration), *4: clay mineral (LUCENTITE SPN (trade name) manufactured by CO-OP CHEMICAL CO., LTD., tabular), and *5: glass beads (Unibeads SPL-30 manufactured by UNITIKA LTD.).

The invention claimed is:

1. A pressure-sensitive adhesive layer for an optical film made from an aqueous dispersion-type pressure-sensitive adhesive composition, wherein
the aqueous dispersion-type pressure-sensitive adhesive composition is an aqueous dispersion comprising a water-dispersible (meth)acryl-based copolymer (A) containing an alkyl(meth)acrylate and a carboxyl group-containing monomer as monomer units and having a glass transition temperature from −55° C. to less than 0° C. (wherein the glass transition temperature is calculated based on monofunctional monomers for monomer units); and a water-soluble or water-dispersible component (B) having a glass transition temperature of 0° C. or more,
a difference of the glass transition temperatures between the (meth)acryl-based copolymer (A) and the component (B) is 50° C. or more,
a mixture ratio (A)/(B) (on a solid weight basis) of the (meth)acryl-based copolymer (A) and the component (B) is in the range of 50-97/3-50,
the component (B) forms domains with maximum lengths between 1 nm and 200 nm in a resin component made of the (meth)acryl-based copolymer (A), and
the pressure-sensitive adhesive layer has a haze value (H20) of 1% or less wherein the haze value (H20) is a haze of the pressure-sensitive adhesive layer with a thickness of 20 µm;
wherein the component (B) is a water-soluble resin.

2. The pressure-sensitive adhesive layer according to claim 1, wherein the pressure-sensitive adhesive layer has an adhesive strength of 1 to 15 N/25 mm to glass at a peeling rate of 300 mm/minute during a storage period of 30 days or less at a temperature of 23° C. after the pressure-sensitive adhesive layer is bonded to glass, and an adhesive strength of the pressure-sensitive adhesive layer to glass at a peeling rate of more than 300 mm/minute is equal to or less than the adhesive strength of the pressure-sensitive adhesive layer to glass at a peeling rate of 300 mm/minute.

3. The pressure-sensitive adhesive layer according to claim 1, wherein the pressure-sensitive adhesive layer has an adhesive strength of 1 to 25 N/25 mm to glass at a peeling rate of 300 mm/minute after the pressure-sensitive adhesive layer is bonded to glass and stored at a temperature of 60° C. for a time period of 1,000 hours, and an adhesive strength of the pressure-sensitive adhesive layer to glass at a peeling rate of more than 300 mm/minute is equal to or less than the adhesive strength of the pressure-sensitive adhesive layer to glass at a peeling rate of 300 mm/minute.

4. The pressure-sensitive adhesive layer according to claim 1, wherein the water-soluble or water-dispersible organic material is an aqueous dispersion of a (meth)acryl-based copolymer (B) comprising an alkyl(meth)acrylate as a monomer unit.

5. The pressure-sensitive adhesive layer according to claim 1, wherein the component (B) is a water-soluble or water-dispersible inorganic material.

6. The pressure-sensitive adhesive layer according to claim 5, wherein the water-soluble or water-dispersible inorganic material is inorganic particles.

7. The pressure-sensitive adhesive layer according to claim 6, wherein the inorganic particles are a colloidal inorganic material.

8. The pressure-sensitive adhesive layer according to claim 5, wherein the water-soluble or water-dispersible inorganic material is an alkali silicate.

9. The pressure-sensitive adhesive layer for an optical film according to claim 1, which has a ratio (H200)/(H20) of a haze value (H200) to the haze value (H20) of 2 or less, wherein the haze value (H200) is a haze of the pressure-sensitive adhesive layer with a thickness of 200 µm.

10. A pressure-sensitive adhesive layer-attached optical film, comprising an optical film and the pressure-sensitive adhesive layer for an optical film according to claim 1 placed on at least one side of the optical film.

* * * * *